(12) United States Patent
Montaron et al.

(10) Patent No.: US 7,716,028 B2
(45) Date of Patent: May 11, 2010

(54) METHOD FOR MODELING A RESERVOIR USING A 3D WETTABILITY MAP GENERATED FROM A WETTABILITY LOGGING TOOL

(75) Inventors: Bernard Montaron, Paris (FR); Omer Gurpinar, Denver, CO (US)

(73) Assignee: Schlumberger Technology Corporation, Houston, TX (US)

( * ) Notice: Subject to any disclaimer, the term of this patent is extended or adjusted under 35 U.S.C. 154(b) by 646 days.

(21) Appl. No.: 11/646,119

(22) Filed: Dec. 27, 2006

(65) Prior Publication Data

US 2007/0276639 A1 Nov. 29, 2007

Related U.S. Application Data

(60) Provisional application No. 60/808,105, filed on May 24, 2006.

(51) Int. Cl.
G06F 9/455 (2006.01)
(52) U.S. Cl. .............................. 703/10; 702/6
(58) Field of Classification Search .................. 703/10; 250/253; 702/6, 11; 166/268
See application file for complete search history.

(56) References Cited

U.S. PATENT DOCUMENTS

| | | | |
|---|---|---|---|
| 5,146,086 A * | 9/1992 | De et al. ..................... | 250/253 |
| 6,018,497 A | 1/2000 | Gunasekera | |
| 6,078,869 A | 6/2000 | Gunasekera | |
| 6,106,561 A | 8/2000 | Farmer | |
| 6,765,380 B2 | 7/2004 | Freedman et al. | |
| 6,810,370 B1 * | 10/2004 | Watts, III ..................... | 703/10 |
| 6,826,520 B1 * | 11/2004 | Khan et al. ................... | 703/10 |
| 7,054,749 B1 * | 5/2006 | O'Meara, Jr. ................ | 702/6 |
| 2002/0013687 A1 * | 1/2002 | Ortoleva ...................... | 703/10 |
| 2003/0141053 A1 * | 7/2003 | Yuan et al. ................... | 166/248 |
| 2003/0225522 A1 * | 12/2003 | Poe .............................. | 702/11 |
| 2005/0149307 A1 * | 7/2005 | Gurpinar et al. .............. | 703/10 |
| 2006/0020438 A1 * | 1/2006 | Huh et al. ..................... | 703/10 |
| 2006/0289157 A1 * | 12/2006 | Rao ............................. | 166/268 |
| 2007/0061117 A1 * | 3/2007 | Landis et al. ................. | 703/10 |

FOREIGN PATENT DOCUMENTS

WO 99/40532 8/1999

OTHER PUBLICATIONS

Abe, A.A, "Relative Permeability and Wettability implications of dilute surfactants at reservoir condition", A Thesis for Master of Science in Petroleum Engineering, Louisiana State University, 2005.*

(Continued)

*Primary Examiner*—Paul L Rodriguez
*Assistant Examiner*—Kandasamy Thangavelu

(57) ABSTRACT

A method is disclosed for modeling a reservoir, comprising: receiving a set of wettability logs from a wettability logging tool adapted to be disposed in a wellbore; generating a wettability map in response to the wettability logs; generating a gridded simulation model, the gridded simulation model including a plurality of grid cells; determining, for each grid cell of the gridded simulation model, a local value of wettability from the wettability map; determining, for each grid cell of the gridded simulation model, a permeability model and a capillary pressure model from the local value of wettability associated with each grid cell; and generating a set of simulation results representing characteristics of the reservoir.

22 Claims, 9 Drawing Sheets

OTHER PUBLICATIONS

Elshahwi et al., "Capillary Pressure and Rock wettability effects on wireline formation tester measurements", Society of Petroleum Engineers, Inc., 1999.*

Eleri et al., "Steady-sate and unsteady-state two-phase relative permeability hysteresis and measurements of three-phase relative permeabilities using imaging techniques", Society of Petroleum Engineers, Inc., 1995.*

Man et al., "Pore network modeling of electrical resistivity and capillary pressure characteristics", Kluwer Academic Publishers, 2000.*

Kelker, M., "Exploitation and optimization of reservoir performance in Hunton Formation, Oklahoma", The University of Tulsa, 2003.*

Muneta et al.; "Formulation of "capillary force barriers" in moderately-oil wet systems and its application to reservoir situation" 11th ADIPEC: Abu Dhabi International Petroleum Exhibition and Conference-Conference Proceedings 2004 Society of Petroleum Engineers (SPE) US, 2004, pp. 1-10, XP002504234.

Haro; "The perfect permeability transform using a loogs and cores" 2004 SPE Annual Technical Conference and Exhibition Proceedings, 2004 Society of Petroleum Engineers (SPE) US, 2004, pp. 33-49 XP002504235.

Siddiqui et al; "Data visualization challenges for displaying laboratory core and flow data in three-dimensions" SPE Technical Symposium of Saudi Arabia, 2005, pp. 1-17, ZP002504236 p. 1-p.2.

* cited by examiner

FIG.7
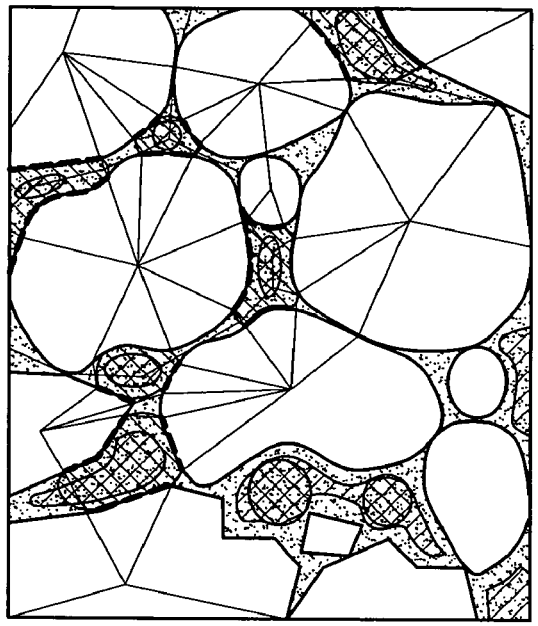
▨ BRINE  ▨ OIL  ▨ GRAINS
—— PORE SURFACE COVERED BY WATER
---- PORE SURFACE COVERED BY OIL
$X_O$ = OIL-WETTING INDEX
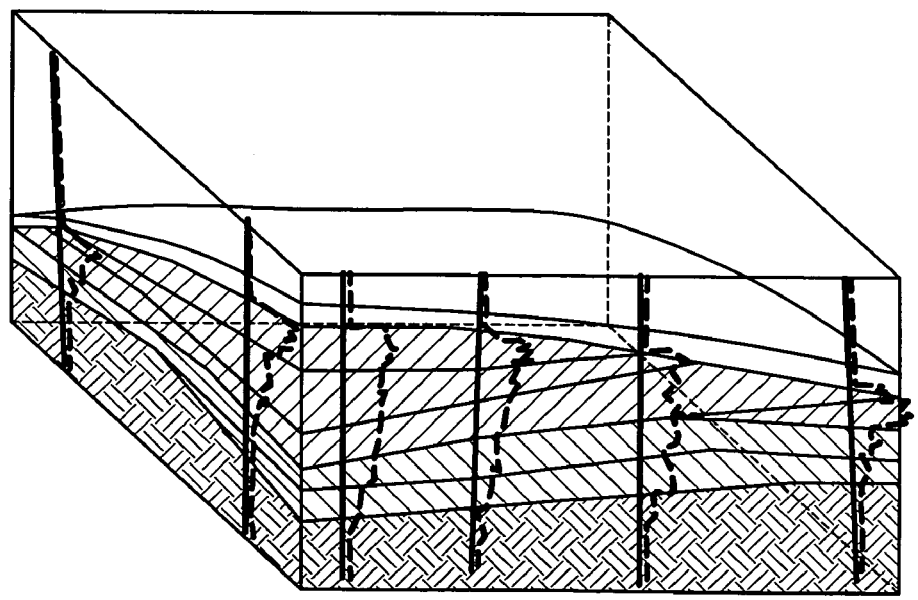
FIG.8

METHOD FOR MODELING A RESERVOIR USING A 3D WETTABILITY MAP GENERATED FROM A WETTABILITY LOGGING TOOL

CROSS REFERENCE TO RELATED APPLICATIONS

This is a Utility application of Provisional Application Ser. No. 60/808,105, filed May 24, 2006, entitled "Method for Modeling a Reservoir Using a 3D Wettability Map Generated From a Wettability Logging Tool".

BACKGROUND

This subject matter disclosed in this specification relates to a method for modeling a reservoir, including a corresponding system and program storage device and computer program, which is practiced by a simulator that is adapted to be stored in a workstation or other computer system. The method includes receiving a 3D wettability map of the reservoir that is generated from wettability logs of a wettability logging tool disposed in a wellbore; defining, from the wettability map, a local value of wettability for each grid block of a gridded simulation model; and defining, from the local value of wettability, a permeability model and a capillary pressure model for each grid block of the gridded simulation model that is provided to the simulator when modeling the reservoir.

Current hydrocarbon reservoir numerical flow simulators have been developed based on models and algorithms which do not use a 'wettability map', and its distribution, as an input to the simulator. This specification discloses a simulator which responds to a '3D wettability map' generated from 'wettability logs (Xo)', a 'relative permeability model and an 'effective permeability model' as a function of the 'wettability logs (Xo)' and a 'capillary pressure model as a function of the 'wettability logs (Xo)', the 'effective permeability model' and 'capillary pressure model' being provided as a direct input to the simulator and generating, from the simulator, a set of simulation results, a user/operator selecting a set of parameters from the set of simulation results which represent characteristics of the reservoir.

SUMMARY

One aspect of the present invention involves a method of modeling a reservoir, comprising: receiving a 3D wettability map of the reservoir that is generated from wettability logs of a wettability logging tool disposed in a wellbore; defining, from the wettability map, a local value of wettability for each grid block of a gridded simulation model; and defining, from the local value of wettability, a permeability model and a capillary pressure model for each grid block of the gridded simulation model that is provided to a simulator when modeling the reservoir.

Another aspect of the present invention involves a computer program adapted to be executed by a processor, the computer program, when executed by the processor, conducting a process for modeling a reservoir, the process comprising: receiving a 3D wettability map of the reservoir that is generated from wettability logs of a wettability logging tool disposed in a wellbore; defining, from the wettability map, a local value of wettability for each grid block of a gridded simulation model; and defining, from the local value of wettability, a permeability model and a capillary pressure model for each grid block of the gridded simulation model that is provided to a simulator when modeling the reservoir.

Another aspect of the present invention involves a method of modeling a reservoir, comprising: (a) generating a set of wettability logs from a wettability logging tool disposed in a wellbore; (b) generating a 3D wettability map of the reservoir from the set of wettability logs generated by the wettability logging tool disposed in the wellbore; (c) determining, from the wettability map, a local value of wettability for each grid cell of a gridded simulation model; and (d) determining, from the local value of wettability associated with each grid cell, a permeability model and a capillary pressure model for each grid cell of the gridded simulation model, the permeability model and the capillary pressure model being provided to a simulator when the simulator models the reservoir.

Another aspect of the present invention involves a program storage device readable by a machine tangibly embodying a program of instructions executable by the machine to perform method steps for modeling a reservoir, the method steps comprising: (a) generating a set of wettability logs from a wettability logging tool disposed in a wellbore; (b) generating a 3D wettability map of the reservoir from the set of wettability logs generated by the wettability logging tool disposed in the wellbore; (c) determining, from the wettability map, a local value of wettability for each grid cell of a gridded simulation model; and (d) determining, from the local value of wettability associated with each grid cell, a permeability model and a capillary pressure model for each grid cell of the gridded simulation model, the permeability model and the capillary pressure model being provided to a simulator when the simulator models the reservoir.

Another aspect of the present invention involves a computer program adapted to be executed by a processor, the computer program, when executed by the processor, conducting a process for modeling a reservoir, the process comprising: (a) generating a set of wettability logs from a wettability logging tool disposed in a wellbore; (b) generating a 3D wettability map of the reservoir from the set of wettability logs generated by the wettability logging tool disposed in the wellbore; (c) determining, from the wettability map, a local value of wettability for each grid cell of a gridded simulation model; and (d) determining, from the local value of wettability associated with each grid cell, a permeability model and a capillary pressure model for each grid cell of the gridded simulation model, the permeability model and the capillary pressure model being provided to a simulator when the simulator models the reservoir.

Another aspect of the present invention involves a system adapted for modeling a reservoir, comprising: apparatus adapted for generating a set of wettability logs from a wettability logging tool disposed in a wellbore; apparatus adapted for generating a 3D wettability map of the reservoir from the set of wettability logs generated by the wettability logging tool disposed in the wellbore; apparatus adapted for determining, from the wettability map, a local value of wettability for each grid cell of a gridded simulation model; and apparatus adapted for determining, from the local value of wettability associated with each grid cell, a permeability model and a capillary pressure model for each grid cell of the gridded simulation model, the permeability model and the capillary pressure model being provided to a simulator when the simulator models the reservoir.

Another aspect of the present invention involves a method for modeling a reservoir, comprising: receiving a set of wettability logs from a wettability logging tool adapted to be disposed in a wellbore; generating a wettability map in response to the wettability logs; generating a gridded simulation model, the gridded simulation model including a plurality of grid cells; determining, for each grid cell of the gridded simulation model, a local value of wettability from the wettability map; determining, for each grid cell of the gridded simulation model, a permeability model and a capillary pressure model from the local value of wettability associated with the each grid cell; and generating a set of simulation results representing a model of the reservoir.

Another aspect of the present invention involves a program storage device readable by a machine tangibly embodying a program of instructions executable by the machine to perform method steps for modeling a reservoir, the method steps comprising: receiving a set of wettability logs from a wettability logging tool adapted to be disposed in a wellbore; generating a wettability map in response to the wettability logs; generating a gridded simulation model, the gridded simulation model including a plurality of grid cells; determining, for each grid cell of the gridded simulation model, a local value of wettability from the wettability map; determining, for each grid cell of the gridded simulation model, a permeability model and a capillary pressure model from the local value of wettability associated with the each grid cell; and generating a set of simulation results representing a model of the reservoir.

Another aspect of the present invention involves a computer program adapted to be executed by a processor, the computer program, when executed by the processor, conducting a process for modeling a reservoir, the process comprising: receiving a set of wettability logs from a wettability logging tool adapted to be disposed in a wellbore; generating a wettability map in response to the wettability logs; generating a gridded simulation model, the gridded simulation model including a plurality of grid cells; determining, for each grid cell of the gridded simulation model, a local value of wettability from the wettability map; determining, for each grid cell of the gridded simulation model, a permeability model and a capillary pressure model from the local value of wettability associated with the each grid cell; and generating a set of simulation results representing a model of the reservoir.

Another aspect of the present invention involves a system adapted for modeling a reservoir, comprising: first apparatus responsive to a set of wettability logs from a wettability logging tool adapted to be disposed in a wellbore adapted for generating a wettability map in response to the wettability logs; second apparatus adapted for generating a gridded simulation model when the wettability map is generated by the first apparatus, the gridded simulation model including a plurality of grid cells; third apparatus adapted for determining, for each grid cell of the gridded simulation model, a local value of wettability from the wettability map; fourth apparatus adapted for determining, for each grid cell of the gridded simulation model, a permeability model and a capillary pressure model from the local value of wettability associated with the each grid cell; and fifth apparatus adapted for generating a set of simulation results representing a model of the reservoir.

Further scope of applicability will become apparent from the detailed description presented hereinafter. It should be understood, however, that the detailed description and the specific examples set forth below are given by way of illustration only, since various changes and modifications within the spirit and scope of the 'method for modeling a reservoir', as described and claimed in this specification, will become obvious to one skilled in the art from a reading of the following detailed description.

BRIEF DESCRIPTION OF THE DRAWINGS

A full understanding will be obtained from the detailed description presented hereinbelow, and the accompanying drawings which are given by way of illustration only and are not intended to be limitative to any extent, and wherein:

FIG. 7 is a schematic representation of a 'mixed-wet' porous medium explaining a definition of the term 'wettability', FIG. 8 is a schematic description of a '3D wettability map' of an oil and gas reservoir, FIGS. 9 and 10 describe the method used to derive more accurate permeability and saturation models in order to define the values which will be used for these parameters in the reservoir model and for the simulation grid.

DETAILED DESCRIPTION

This specification discloses a 'method for modeling a reservoir' which utilizes a simulator software 12 (hereinafter, a 'simulator' 12) that responds to and uses: (1) a '3D wettability map' [that is generated by interpreting 'wettability logs (Xo)' generated from a wettability logging tool] for defining a local value of wettability in each grid block of a simulated formation, (2) a 'relative permeability model' as a function of (Xo) and an 'effective permeability model' as a function of (Xo) in each grid block of the simulated formation, and (3) a 'capillary pressure model as a function of (Xo)' in each grid block of the simulated formation, where the 'relative permeability model' and the 'effective permeability model' and the 'capillary pressure model' are each a function of the 'wettability logs (Xo)'. The 'effective permeability model as a function of (Xo)' and the 'capillary pressure model, as a function of the wettability logs (Xo), are provided as direct inputs to the simulator 12 thereby generating a set of simulation results from the simulator, a user/operator selecting a set of parameters from the set of simulation results representing characteristics of the reservoir.

A reservoir modeling and simulation software (hereinafter, a simulator) receives and uses a 3D wettability map of the reservoir which is generated by interpreting a set of wettability logs generated from a wettability logging tool adapted to be disposed in a wellbore. The 3D wettability map is used to define a local value of wettability in each grid block of a simulated Earth formation penetrated by the wellbore. The local value of wettability in each grid block is also used to define a corresponding 'relative permeability model' and an 'effective permeability model' and a 'capillary pressure model' (each of which is a function of the local value of wettability) for each grid block of the simulated Earth formation, thereby defining a 'simulated and gridded Earth formation'. The 'simulated and gridded Earth formation' is input to the simulator, and, responsive thereto, the simulator generates a 'set of simulation results'. A user/operator analyzes the 'set of simulation results' for the purpose of selecting a set of dynamic parameters representing characteristics of the reservoir. This allows the user/operator to completely account for the distribution of 'wettability' in the reservoir when doing multi-phase flow simulations with dramatic impact on the fluid front propagation and production predictions.

Figure 11:
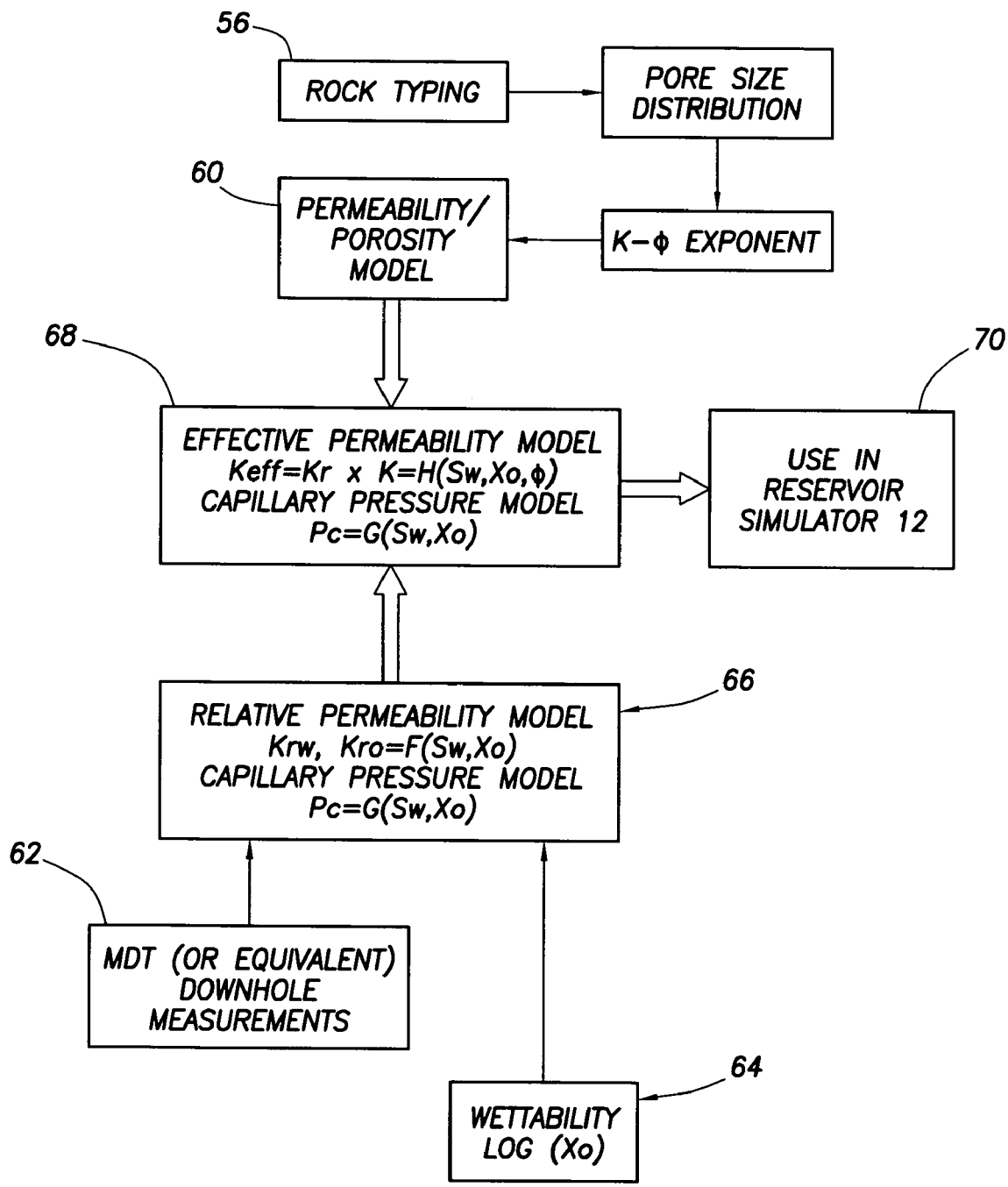
FIG. 11 shows an example of the process that can be followed to model the dynamic parameters, such as permeabilities, relative to oil and water, and capillary pressure, as functions of water saturation and wettability, in downhole conditions.

Although traditional reservoir simulation models have traditionally obtained 'relative permeability' and 'capillary pressure' information from laboratory measurements, in this specification, the 'relative permeability (kr)' and the 'effective permeability (Keff) and the 'capillary pressure (Pc)' information are each obtained from 'wettability measurements', generated from wettability logs obtained from wettability logging tools disposed downhole, that are accompanied by 'other dynamic measurements' obtained from other such tools disposed downhole, such as the Modular Dynamic Tester (MDT) dynamic measurements illustrated in block 62 of FIG. 11. Consequently, in this specification, by obtaining 'wettability measurements' from 'wettability logs' generated from 'wettability logging tools' disposed downhole in a wellbore, and by combining these 'wettability measurements' with the 'other dynamic measurements' from other tools disposed downhole (such as the MDT of block 62 of FIG. 11), one can generate and determine the 'relative permeability (Kr)' and the 'capillary pressure (Pc)' distribution throughout the reservoir.

Current hydrocarbon reservoir numerical flow simulators have been developed based on models and algorithms which do not use wettability and its distribution as a direct input instead other parameters influenced by wettability are used. Those parameters are called relative permeability and capillary pressure and they are measured through core plug displacement tests performed in special laboratories. Relative permeability and capillary pressure relationships are very important since they not only impact the 'hydrocarbon in place' estimation but also the 'hydrocarbon recovery forecast' in numerical simulators. Core plugs are pre-processed for wettability restoration to achieve the reservoir conditions in a laboratory environment. However, the state of the art described above indicates two shortcomings: (a) the volume of rock evaluated in the laboratories are insignificant compared with the reservoir rock; as a result, the laboratory work may not be applicable to the entire reservoir; and (b) true reservoir wettability distribution is not captured. The 'water-wet' assumption can be traced back to the theory that hydrocarbon bearing formations originated in water-wet environments (either marine or fresh water depositional environments), and to the general belief that a porous rock, which was originally 'water-wet', had to remain so, in most cases, even after hydrocarbons migrated into the porous rock. Such a model was initially comforted by the fact that most oil-bearing sandstone formations are indeed 'water-wet' and, historically, these were first to be exploited massively and studied in detail. Building the model to match a 'water-wet' behavior was also a guarantee to match the response of a significant part of the reservoir simulation applications.

On the other hand, even for those who wanted to include wettability in their models, there were no algorithms available which had been validated on a wide range of field cases. The most evolved reservoir simulators currently available in the industry incorporate these effects in an empirical way by using capillary pressure curves and relative permeability curves generally measured on core samples in the laboratory. Such curves are known to be poorly representative of actual downhole fluid flow behavior for several reasons: (1) It is extremely difficult to preserve cores when bringing them to the surface and to avoid wettability alteration due, for example, to asphaltene precipitation in cores submitted to changing pressure or temperature; (2) Varying saturation of cores in the laboratory is done on a time scale which has a completely different time range compared to the very slow processes happening in a reservoir during geological times, and this leads to permeability and capillary pressure curves which can be quite different from downhole curves; (3) There is no validated quantitative model to change these curves with wettability; and there was, until now, no downhole wettability continuous logging measurement available in the industry, and therefore there was no measured wettability map of the reservoir.

The importance of wettability for the modeling and dynamic simulation of reservoirs has been recognized by the oil and gas industry at large. An example of a bad case scenario is as follows: when water is injected at a given vertical depth in an injection well and the water is expected to fall by gravity in the reservoir, the water comes out of a production well several years later and several kilometers away from the injector, approximately at the same vertical depth at which it was injected. In the absence of identified geological barriers, the only explanation, generally the last one considered, are capillary effects; that is, the reservoir must be sufficiently 'oil-wet' in this zone to prevent water from falling since it can only flow horizontally. Such a behavior is impossible to account for if a wettability map of the reservoir is not available. This type of example makes other sources of uncertainty look almost insignificant compared to not knowing the distribution of the wettability in the reservoir.

Figure 6:
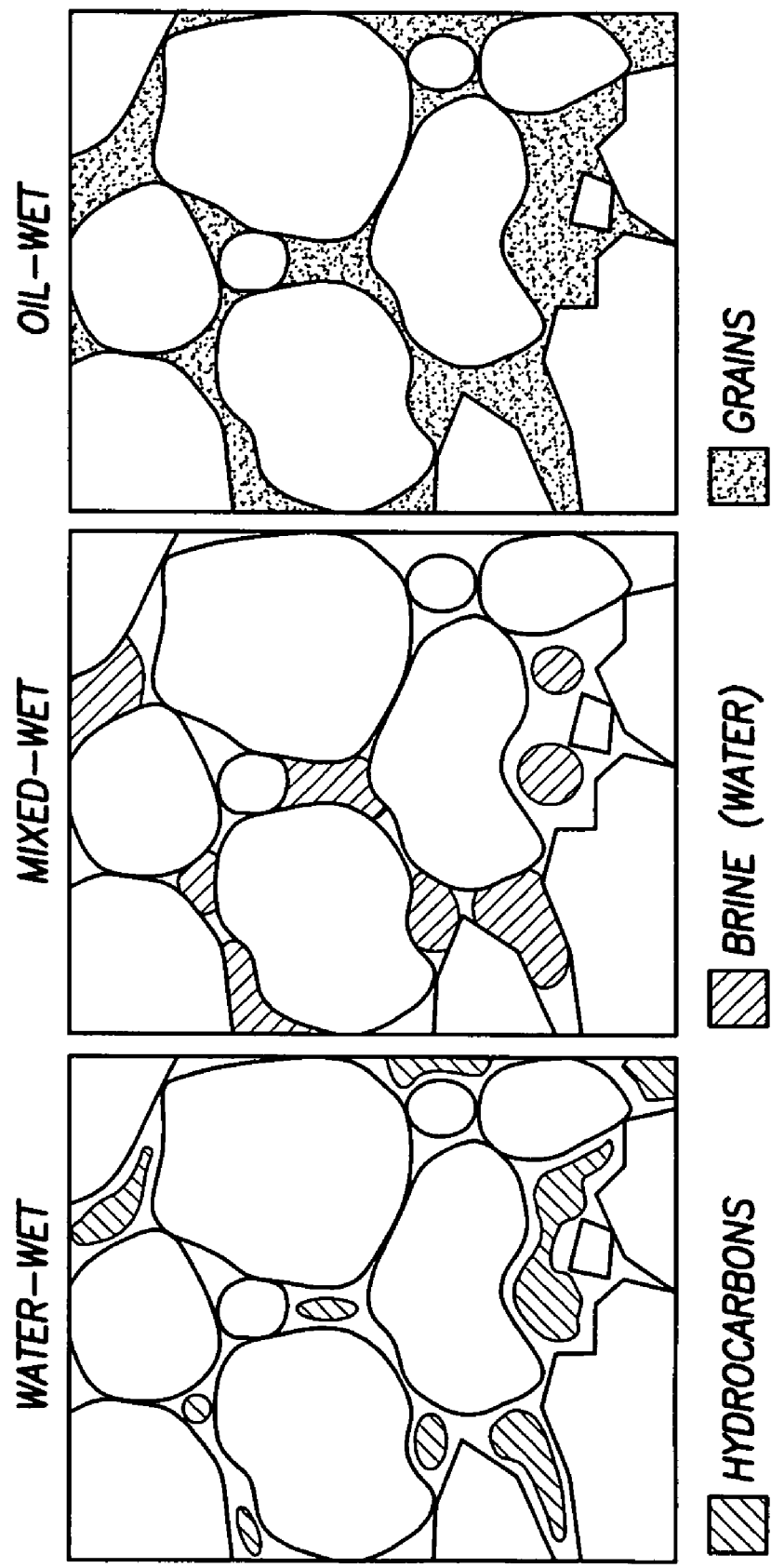
FIG. 6 is a schematic illustration of the definition of the terms 'water-wet' and 'oil-wet' and 'mixed-wet', that is, when the surface of the pores is entirely covered by water, this refers to 'water-wet', or when the surface of the pores is entirely covered by oil, this refers to 'oil-wet', and an intermediate state refers to 'mixed-wet'.

In contrast to sandstone formations, most oil-bearing carbonate reservoirs are believed to be 'oil-wet', at least to some degree, and the term "mixed-wet" is being used to qualify a situation intermediate between perfectly water-wet and perfectly oil-wet. "Hydrocarbon-wet" would be a more appropriate term than "oil-wet" because hydrocarbons can exist in several forms including gas, condensate, oil and tar or bitumen, but "oil-wet" is a more popular term and must be understood in the general sense of "hydrocarbon-wet". FIG. 6 provides a schematic description of these notions. Completely oil-wet reservoirs or zones of the reservoir are believed to be quite rare. However, such zones do exist as, for example, tar mats or zones in heavy oil bearing formations. In contrast, and this even in carbonate reservoirs, perfectly water-wet zones are very common, and are expected to be found near or below the oil-water contact in the lower part of most reservoirs having a water drive.

The lack of good quantitative modeling of 'wettability effects' can also be partially attributed to the fact that most wettability laboratory tests used in the industry (e.g. Amott wettability index, Amott-Harvey, or USBM) do not relate to any clearly quantifiable geometrical fluid distribution in porous media. As a result, these tests are not prone to numerical modeling and even less to theoretical modeling. Another, and perhaps the main, difficulty are the dramatic hysteresis effects plaguing the dynamic tests done on cores, rendering theoretical work and its validation almost impossible. These effects are the result of operating far from equilibrium, and using core samples which are very small compared to the heterogeneity scale of reservoirs, particularly carbonate reservoirs. As a result of all these limitations, oil and gas companies find it very difficult to reconcile laboratory tests done on cores with actual downhole dynamic behavior of formation fluids.

Consequently, this specification discloses a 'reservoir modeling system' (see FIGS. 1 and 2) adapted for practicing a '3D numerical flow simulation', wherein the concept of 'Wettability' is introduced directly to the '3D numerical flow simulation' method that is practiced by the 'reservoir modeling system'. As a result, the 'reservoir modeling system' receives and is based on: (1) '3D wettability maps' constructed from continuous wettability logs which are measured in wells and therefore at downhole reservoir conditions, and (2) 'dynamic properties models', such as 'relative permeabilities' and 'capillary pressure', that are completely validated by dynamic measurements made downhole and are directly linked to the wettability logging measurements.

Figure 1:
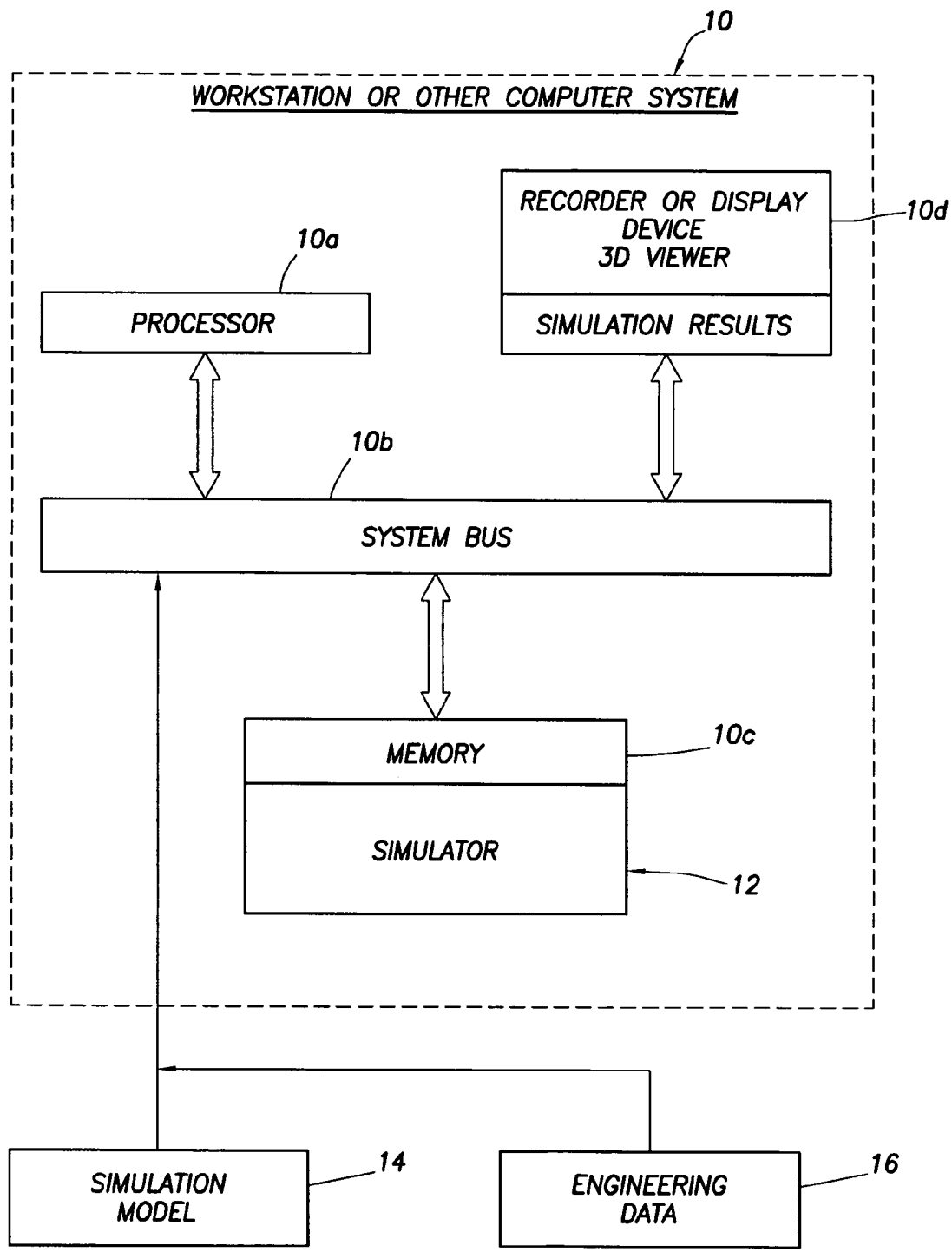
FIG. 1 illustrates a workstation or other computer system which stores the simulator software and which generates the set of simulation results.
Figure 2:
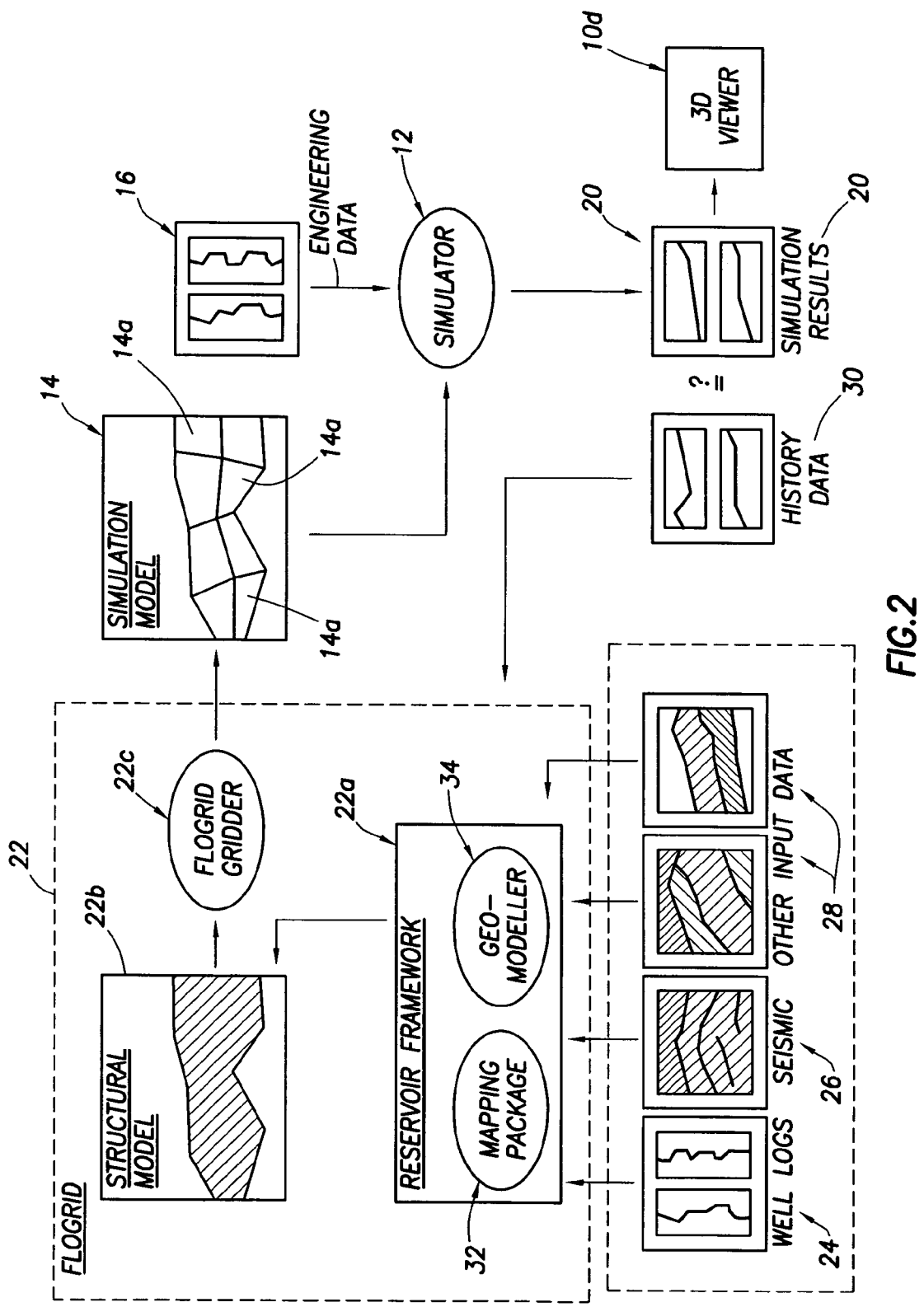
FIG. 2 illustrates a 'reservoir modeling system' which is adapted for practicing a 'method for modeling a reservoir' including a '3D numerical flow simulation', the 'reservoir modeling system' including: the simulator software of FIG. 1 adapted to be stored in the workstation or other computer system of FIG. 1, a set of well logs that are generated by well logging tools and are provided to a mapping package of a reservoir framework, a structural model of the reservoir which is generated from the reservoir framework, a gridder which grids the structural model thereby generating a gridded simulation model, and the simulator which responds to the gridded simulation model for generating a set of simulation results from which the relative permeability and capillary pressure are determined.
Figure 5:
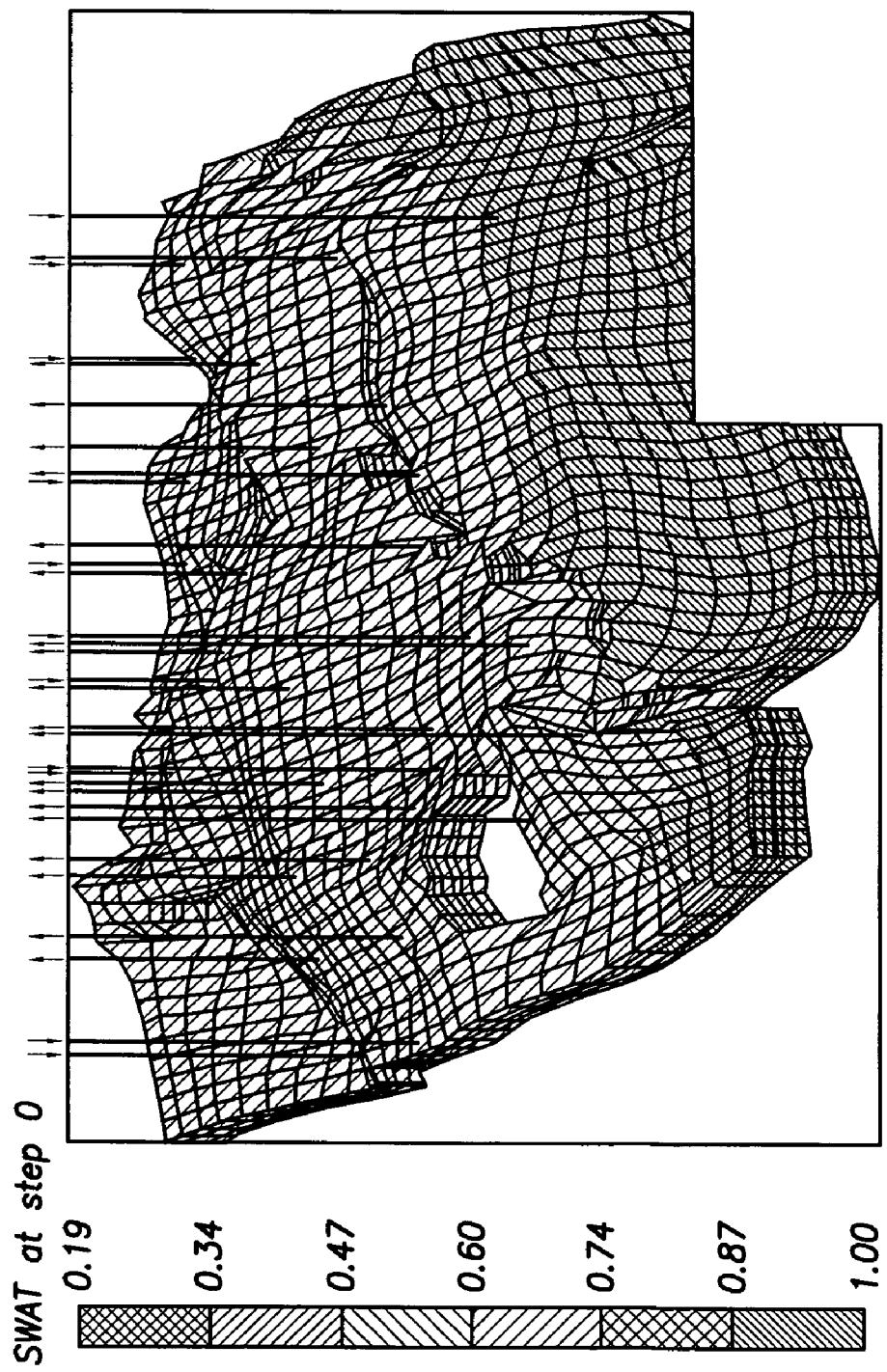
FIG. 5 illustrates an example of the set of simulation results which are generated by the simulator software of FIGS. 1 and 2 and are recorded or displayed on the 'recorder or display device or 3D viewer' of FIG. 1.

Referring to FIG. 1, a workstation or other computer system 10, which stores a 'Simulator Software' (hereinafter, the 'Simulator') and which represents a portion of the aforementioned 'reservoir modeling system' (shown in FIG. 2), is illustrated. In FIG. 1, the workstation or other computer system 10 is adapted to store a 'Simulator Software'. The computer system 10 of FIG. 1 includes a Processor 10*a* operatively connected to a system bus 10*b*, a memory or other program storage device 10*c* operatively connected to the system bus 10*b*, and a recorder or display device or 3D Viewer 10*d* operatively connected to the system bus 10*b*. The memory or other program storage device 10*c* stores a 'Simulator Software' 12 (hereinafter, the 'Simulator' 12) that practices the '3D numerical flow simulation' method or technique practiced by the 'reservoir modeling system' as previously discussed and disclosed in this specification. The computer system 10 receives two types of 'input data': (1) a Simulation Model 14, and (2) Engineering Data 16, as shown in FIG. 2. The 'Simulator Software' 12, which is stored in the memory 10*c* of FIG. 1, can be initially stored on a CD-ROM, where that CD-ROM is also a 'program storage device'. That CD-ROM can be inserted into the computer system 10, and the 'Simulator Software' 12 can be loaded from that CD-ROM and into the memory/program storage device 10*c* of the computer system 10 of FIG. 1. The Processor 10*a* will execute the 'Simulator Software' 12 that is stored in memory 10*c* of FIG. 1; and, responsive thereto, the Processor 10*a* will generate an 'output display' that is recorded or displayed on the Recorder or Display device or 3D Viewer 10*d* of FIG. 1. An example of that 'output display', which is recorded or displayed on the Recorder or Display device or 3D Viewer 10*d* of FIG. 1, is illustrated in FIG. 5. Recall that the 'output display' generated by the Recorder or Display device or 3D Viewer 10*d* of FIG. 1, as shown in FIG. 5, will generate and display a 'set of simulation results', as discussed in this specification. A user/operator analyzes the 'set of simulation results' for the purpose of selecting a set of dynamic parameters representing characteristics of the reservoir. This allows the user/operator to completely account for the distribution of 'wettability' in the reservoir when doing multi-phase flow simulations with dramatic impact on fluid front propagation and production predictions. The computer system 10 of FIG. 1 may be a personal computer (PC), a workstation, a microprocessor, or a mainframe. Examples of possible workstations include a Silicon Graphics Indigo 2 workstation or a Sun SPARC workstation or a Sun ULTRA workstation or a Sun BLADE workstation. The memory or program storage device 10*c* (including the above referenced CD-ROM) is a 'computer readable medium' or a 'program storage device' which is readable by a machine, such as the processor 10*a*. The processor 10*a* may be, for example, a microprocessor, microcontroller, or a mainframe or workstation processor. The memory or program storage device 10*c*, which stores the 'Simulator Software' 12, may be, for example, a hard disk, ROM, CD-ROM, DRAM, or other RAM, flash memory, magnetic storage, optical storage, registers, or other volatile and/or non-volatile memory.

Referring to FIG. 2, the aforementioned 'reservoir modeling system', which includes the Simulator 12 of FIG. 1 adapted for practicing the '3D numerical flow simulation', is illustrated. FIG. 2 includes the 'Flogrid Gridder' which is discussed in U.S. Pat. No. 6,106,561 to Farmer, the disclosure of which is incorporated by reference into the specification of this application. Since the 'Flogrid Gridder' of FIG. 2 further includes the 'Petragrid Un-structured Gridder', see also U.S. Pat. Nos. 6,018,497 and 6,078,869 to Gunasekera, the disclosures of which are incorporated by reference into the specification of this application. In FIG. 2, the simulator 12 responds to the simulation model 14 and the engineering data 16 for generating the set of simulation results 20 which are recorded or displayed on the 3D Viewer 10*d*. The simulation model 14 responds to the 'Flogrid' software 22, and the 'Flogrid' software 22 responds to certain input data including well logs 24, seismic data 26, and other input data 28. As noted earlier, the 'Flogrid' software 22 is disclosed in U.S. Pat. No. 6,106,561 to Farmer, the disclosure of which has already been incorporated by reference into the specification of this application. The 'Flogrid' software 22 includes a Reservoir Framework 22*a*, a Structural Model 22*b*, and a Flogrid gridder 22*c*. The Reservoir Framework 22*a* includes a Mapping package 32 and a Geo-Modeller 34, each of which is responsive to the well logs 24, the seismic data 26, and the other input data 28. In a 'history matching' method or technique, the set of simulation results (representing 'output data') 20 is compared with certain expected history data (representing 'historical output data') 30. In the 'history matching' technique, if the simulation model 14 is correctly adjusted, the simulation results 20 should nearly match or should be approximately equal to the history data 30. However, when the simulation results 20 do not nearly match or is not approximately equal to the history data 30, the simulation model 14 is re-adjusted and then the simulator 12 generates another set of simulation results 20; and this process repeats until the simulation results 20 do, in fact, nearly match or is approximately equal to the history data 30. In operation, referring to FIG. 2, the well logs 24, the seismic data 26, and the other input data 28 are generated and provided to the Flogrid software 22. The well logs 24 include a set of 'wettability logs (Xo)' which are generated by a 'Wettability Logging Tool' disposed in a wellbore. An example of a 'Wettability Logging Tool' is disclosed in the following patent specifications (1) U.S. Patent Publication No. 2009/0292472 of U.S. patent application Ser. No. 11/721,879 entitled "Method for the Characterization of Geological Formations," filed on Jun. 15, 2007, owned by "Schlumberger", such as "Services Petroliers Schumberger" or "Schlumberger Technology Corporation", the disclosure of which is incorporated by reference to the specification of this application, and (2) U.S. patent application Ser. No. 11/382,514 issued as U.S. Pat. No. 7,532,983 and entitled "Method and Apparatus for Measuring the Wettability of Geological Formations," filed on May 10, 2006, owned by "Schlumberger", such as "Services Petroliers Schlumberger" or "Schlumberger Technology Corporation", the disclosure of which is incorporated by reference into the specification of this application. A method for determining 'wettability' of an oil reservoir using NMR measurements is disclosed in U.S. Pat. No. 6,765,380 to Freedman et al, the disclosure of which is incorporated by reference into the specification of this application. As noted earlier, the well logs 24 include a set of 'wettability logs (Xo)' which are generated by a 'Wettability Logging Tool' disposed in a wellbore. The 'wettability logs (Xo)' are used to generate a '3D Wettability Map', an example of which is shown in FIG. 8. In FIG. 2, the 'wettability logs (Xo)' 24, including the seismic data 26 and the other input data 28, are used to generate the Reservoir Framework 22a which includes the Mapping Package 32 and the Geo-Modeller 34. The Reservoir Framework 22a actually represents the aforementioned '3D Wettability Map'. The '3D Wettability Map' represents a section of Earth formation which contains and includes a multitude of 'local values of wettability' in the earth formation, where each 'local value of wettability' is associated with a single location on the 3D map of the Earth formation of FIG. 8. Therefore, the 'multitude of local values of wettability' on the '3D Wettability Map' is associated, respectively, with a corresponding multitude of locations on a section of Earth formation as shown FIG. 8. As a result, the '3D Wettability Map' of FIG. 8, represented by the Reservoir Framework 22a, is used to build the Structural Model 22b. The Structural Model 22b (containing a multitude of local values of wettability) is gridded by the Flogrid Gridder 22c (in the manner discussed in U.S. Pat. No. 6,106,561 to Farmer, the disclosure of which has already been incorporated by reference into the specification of this application) thereby generating a gridded Simulation Model 14. That is, when the Structural Model 22a (representing a section of Earth Formation containing a multitude of local values of 'wettability') is gridded by structured or unstructured grids in the manner discussed in U.S. Pat. No. 6,106,561 to Farmer, a multitude of structured and/or unstructured grid cells (14a of FIG. 2) will overlay the Earth Formation of the Structural Model 22b, thereby generating the gridded Simulation Model 14, where the gridded Simulation Model 14 includes a multitude of grid cells 14a, and each grid cell 14a of the gridded Simulation Model 14 includes its own corresponding 'local value of wettability' obtained from the '3D Wettability Map' of FIG. 8. The 'local value of wettability' in 'each grid cell' 14a is used to calculate and determine an 'effective permeability model' (Keff) for said 'each grid cell' 14a, a 'relative permeability model' (Kr) for said 'each grid cell' 14a, and a 'capillary pressure model' for said 'each grid cell' 14a. Since the 'effective permeability model' and the 'relative permeability model' and the 'capillary pressure model' for said 'each grid cell' 14a is based on and obtained from the '3D Wettability Map' (of FIG. 8), where the '3D Wettability Map' is, in turn, generated in response to 'wettability measurements' obtained from 'wettability logging tools' disposed downhole, the 'effective permeability model' and the 'relative permeability model' and the 'capillary pressure model' for 'each grid cell' 14a are each deemed to be more accurate than hereinbefore (that is, the 'relative permeability' and 'effective permeability' and 'capillary pressure' models do not result from core measurements made in the laboratory, since these core measurements made in the laboratory are not fully representative of downhole conditions). In FIG. 2, the simulator 12 is executed by Processor 10a of FIG. 1 while responding to the Simulation Model 14 (of FIGS. 1 and 2) and the Engineering Data 16, thereby generating the set of Simulation Results 20 which are displayed on the 3D Viewer 10d. Since each of the grid cells 14a of the Simulation Model 14 includes (1) its own corresponding 'local value of wettability' determined from the '3D Wettability Map' which is, in turn, determined from the 'wettability logs (Xo)', (2) its own 'relative permeability model (Kr)' and its own 'effective permeability model (Keff)' which is determined from its own 'local value of wettability', and (3) its own 'capillary pressure model (Pc)' which is determined from its own 'local value of wettability', the Simulation Results 20 displayed on the 3D Viewer 10d of FIG. 2 are now deemed to be more accurate than ever before. As a result, the user/operator of the workstation 10 of FIG. 1 will now analyze the Simulation Results 20 (which are now deemed to be more accurate than ever before) to determine characteristics of the reservoir depicted by the Simulation Model 14. This allows the user/operator to completely account for the distribution of Wettability in the reservoir when doing multi-phase flow simulations with a dramatic impact on fluid front propagation and hydrocarbon production predictions.

Figure 3:
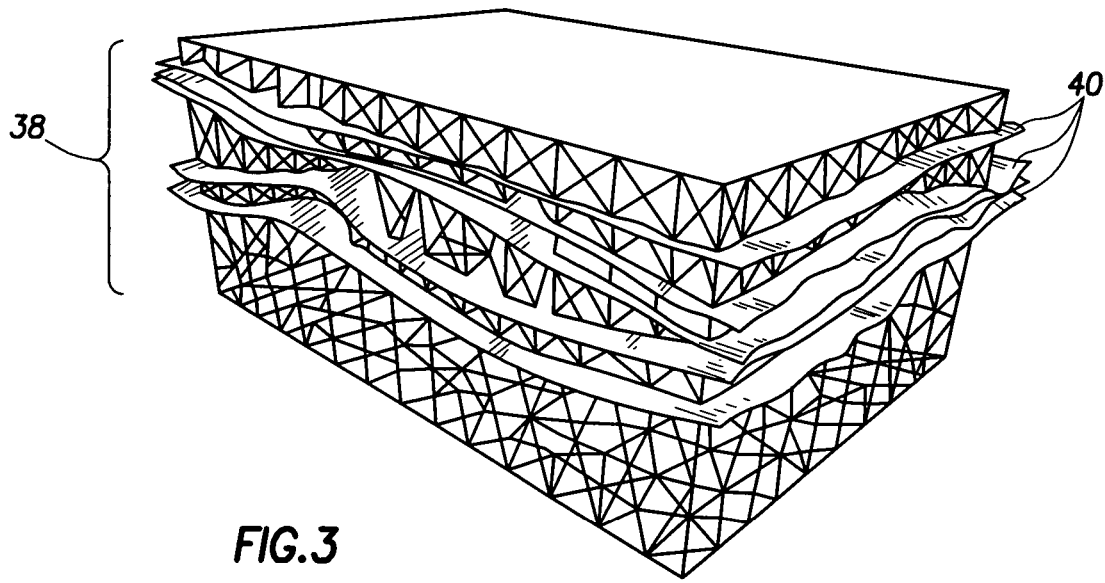
FIGS. 3 and 4 illustrate a gridded Earth formation which represents the gridded simulation model of FIG. 2.
Figure 4:
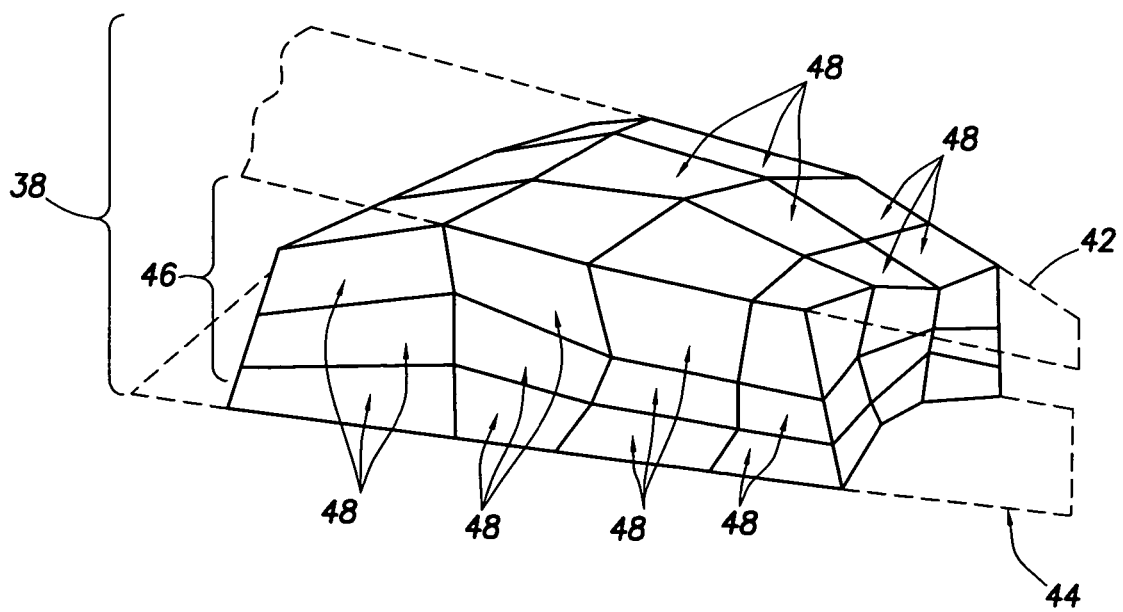

Referring to FIGS. 3 and 4, a more detailed example of the 'gridding' associated with the gridder 22c and the 'gridded Simulation Model' 14 of FIG. 2 is illustrated.

In FIG. 3, an earth formation 38 includes four (4) horizons 40 which traverse the longitudinal extent of the formation 38 in FIG. 3. Recall that a "horizon" 40 is defined to be the top surface of an earth formation layer, the earth formation layer comprising, for example, sand or shale or limestone, etc. The formation 38 is "gridded" between the horizons 40, that is, on top of an uppermost horizon 40 and below a lowermost horizon 40. When gridding the formation 38, the formation 38 will be divided up into a multitude of individual cells which, when connected together, comprise the grid.

In FIG. 4, for example, the formation 38 includes an uppermost horizon 42 and a lowermost horizon 44 which is separated from the uppermost horizon 42 by an intermediate earth formation layer 46. The intermediate earth formation layer 46 includes, for example, a sand layer or a shale layer or a limestone layer, etc. The intermediate earth formation layer 46 will be "gridded". That is, the intermediate earth formation layer 46 will be divided into a multitude of cells 48, called 'grid cells' 48.

Referring to FIG. 5, an example of the set of Simulation Results 20 of FIG. 2 is illustrated.

Referring to FIG. 6, a schematic illustration of the definition of the terms 'water-wet' and 'oil-wet' and 'mixed-wet' is presented, that is, when the surface of the pores is entirely covered by water, this refers to 'water-wet', or when the surface of the pores is entirely covered by oil, this refers to 'oil-wet', and an intermediate state refers to 'mixed-wet'.

The 'reservoir modeling system' of FIG. 2, that is adapted for practicing the '3D numerical flow simulation', integrates '3D wettability information' into current reservoir modeling and simulation systems and allows for the selection, in each grid cell 14a by a user/operator, of the 'models' associated with 'relative permeabilities' and 'capillary pressures' [and other dynamic 'models', such as the 'models' for fluid exchange between fractures and matrix (e.g. counter-current imbibition, and forced imbibition)], each as a function of a local value of the wettability. The 3D wettability map of FIG. 8 is constructed by extrapolating and interpolating a 'wettability log (Xo)' that is acquired in wellbores using Wireline or LWD logging tools that are run in these wells. The 'models' for the aforementioned dynamic parameters, including 'relative permeability' and 'capillary pressure', are derived from measurements made with specific tools run in wellbores, and these 'models' do not rely on core measurements made in the laboratory since these lab measurements are considered not to be fully representative of downhole conditions. This above referenced approach is expected to lead to realistic multiphase fluid flow simulations in reservoir models allowing for more reliable production predictions.

In FIG. 6, a schematic is provided which represents an illustration of the definition of the terms "water-wet" and "oil-wet", respectively, that is, when the surface of the pores is entirely covered by water (i.e., water-wet), and by oil (i.e., oil-wet), and the term "mixed-wet" which reflects an intermediate state. It is interesting to note on this schematic that the same water saturation, i.e. the same water volume fraction of the pore space, can lead to very different electrical conductivities depending of the wettability state of the porous medium. This is the main reason why Archie's law (an equation linking formation resistivity to porosity and water saturation) has been so successful in most sandstone formations (which are water-wet), but has not been so successful in carbonates which are mostly mixed-wet.

A new model called the connectivity equation was proposed recently that replaces Archie's law by the following equation:

$$R_t = \frac{R_w}{(\phi S_w - C_w)^\mu} \quad (1)$$

where Rt is the formation resistivity, Rw is the water or brine resistivity, $\phi$ is the formation porosity, Sw is the water saturation in the porous rock, Cw is the critical water fraction, and $\mu$ is the conductivity exponent. $\phi$ is typically on the order of 2, but it can take various values depending on the pore network geometry and the secondary porosity, such as vugs. In this model the critical water fraction Cw is a function of the oil-wet surface fraction of the rock's porosity Xo. Xo is a parameter between 0 and 1, that provides a direct measurement of the oil-wetting index of the rock, therefore providing a direct assessment of the wettability of the formation. A log versus depth of Cw [see Equation (2)] or a log of the critical saturation Sc versus depth [see Equation (3)] gives the distribution of the formation wettability from the top to the bottom of the reservoir, as follows:

$$C_w = \phi S_w - \left(\frac{R_w}{R_t}\right)^{1/\mu} \quad (2)$$

$$S_c = C_w / \phi \quad (3)$$

Another model called the modified connectivity equation that is also derived from percolation theory, like Equation (1) above, is Equation. (4), where the critical water fraction Cw' is also a function of Xo. This model gives equivalent results except very close to the percolation threshold Cw' where it might be more accurate than Equation (1), as follows:

$$R_t = \frac{R_w(1 - C'_w)^\mu}{(\phi S_w - C'_w)^\mu} \quad (4)$$

Solving for Cw' in Eq.4:

$$C'_w = \frac{\phi S_w - (R_w/R_t)^{1/\mu}}{1 - (R_w/R_t)^{1/\mu}} \text{ and} \quad (5)$$

$$S'_c = C'_w / \phi \quad (6)$$

Cw' logs or Sc' logs can also be used for wettability distribution logging and mapping. In both cases, the critical saturation takes the forms $$S_c = A + X_o \frac{\phi_o}{\phi} S_c^0 \text{ and} \quad (7)$$

$$S'_c = A' + X_o \frac{\phi_o}{\phi} S_c^{0\prime} \quad (8)$$

where $\phi_o$, is the porosity of the oil-wet zones of the porous formation, and where $S_c^0$ and $S_c^{0\prime}$ are constants characteristic of the formation pore network geometry and of the type of fluids contained in the pores. The terms A and A' depend on the other characteristics of the rock (micrite content, vugs) and are assumed negligable here. For typical 'mixed-wet' oil bearing formations, $S_c^0$ is on the order of 0.5-0.7, and $S_c^{0\prime}$ is on the order of 0.9-1. When using Cw, Sc (or Cw', Sc') logs are used to assess the wettability distribution of the formation, and the terms $\phi_o$ or $\phi_o/\phi$ are ignored, i.e. they are assumed to be constant or to vary in a way that is correlated with the formation wettability, and in the same direction as Xo.

If ones needs to make a measurement of Xo, however, it is necessary to determine $\phi_o$ or $\phi_o/\phi$. The ratio $\phi_o/\phi$ can be measured in situ using Nuclear Magnetic Resonance wireline tools (NMR). NMR tools provide signals that are directly linked to the pore size distribution and the type of fluids (water, oil, gas) contained in the various pore sizes. An estimation of the ratio $\phi_o/\phi$ can therefore be derived from NMR T2 relaxation time distribution. This ratio is also linked to the capillary pressure (Pc) of the formation. Several models can be developed where the capillary pressure (Pc) is a function of $\phi_o/\phi$ and the temperature T of the formation. The model takes the form of Equation (9):

$$P_c = P_O(T) F(\phi_o/\phi) \quad (9)$$

where Po has a dimension of a pressure and it varies with the temperature of the formation, and where the function F( ) is characterized with rock cores in the laboratory. Such models (as for example Equation 9) can be used either: (1) to derive the ratio $\phi_o/\phi$ from capillary pressure (Pc) of the formation measured using downhole pressure tools such as MDT, or (2) to derive the capillary pressure (Pc) from $\phi_o/\phi$ if this ratio was measured using a NMR tool. However, what is true for electrical conductivity is also true for fluid permeability. Water and oil will not flow with the same resistance to flow through the three (3) formations presented in FIG. 6, and this will affect the permeabilities relative to water and to oil. Capillary effects will also be significantly different between the three formations of FIG. 6. For example, the water-wet formation shown in FIG. 6 will tend to absorb water in a spontaneous manner when a side of the core sample is placed in contact with free water, but it will not absorb any oil or very little. This phenomena is called 'spontaneous imbibition' and it is the result of the capillary continuity of the film of water. Similarly, an oil-wet formation, such as shown in FIG. 6, would tend to spontaneously imbibe oil and no or very little water. By knowing the wettability of the formation, one can quantify the 'spontaneous imbibition' effects. This is extremely important in order for the reservoir simulator to be able to simulate correctly the fluid exchanges between the rock matrix and draining structures such as wells, fractures, or high permeability layers. The dynamic properties of the formation, being imbibition, relative permeabilities, or capillary pressure are a function of the pore geometry, the fluids saturations, but are also dramatically affected by wettability.

Unlike most reservoir simulators currently in use which are not using 'wettability' as a distributed parameter, the 'reservoir modeling system' of FIG. 2 (which is adapted for practicing '3D numerical flow simulation') will be based on 'models' which fully integrate 'wettability'; and, as a result, this will enable the 'reservoir modeling system' of FIG. 2 to use realistic dynamic parameter values throughout the reservoir, dynamic parameter values including 'permeability' and 'capillary pressure'. For this to be meaningful, one must use 'input data' that has been received from 'wettability logging measurements' that are made directly inside wellbores that are drilled in the reservoir to be modeled.

Referring to FIG. 7, a schematic representation of a 'mixed-wet' porous medium is illustrated, the schematic representation of FIG. 7 providing a definition of a phenomena known as 'wettability', the 'wettability' phenomena being utilized by the 'reservoir modeling system' of FIG. 2 that practices the '3D numerical flow simulation'.

In FIG. 7, as noted above, the 'wettability' of a formation can be quantified by the "structural oil-wetting index" of the formation, which is denoted as 'Xo'. Thus, the 'wettability' of a formation is defined as 'the fraction (i.e., the percentage) of the pores inner surface in contact with hydrocarbons (i.e., gas, condensate, oil, and solid hydrocarbons, such as asphaltenes, tar or bitumen)'. By definition, the remaining fraction of the pore's surface (denoted as 'Xw') is in contact with brine, i.e. formation water; and, as a result:

$$X_w = 1 - X_o.$$

This definition of the 'wettability' state of the formation has the advantage of being geometrical and perfectly suitable for theoretical or numerical modeling. Such a parameter can be measured directly by analyzing images of thin sections of well preserved cores and can be correlated to the various dynamical properties of the formation measured on cores in laboratory tests.

However, a main advantage of this definition of 'wettability' is that the 'structural oil-wetting index (Xo)' can be measured using logging tools disposed downhole in oil and gas wells, and such measurements made in-situ (i.e., downhole in the wells) can be directly correlated with dynamic measurements made downhole with suitable logging tools (such as MDT—Modular Downhole Formation Tester or equivalent), leading to dynamic models which are perfectly representative of downhole conditions. An example of a 'Wettability Logging Tool' (which is based on a combination of resistivity and water saturation independent measurements) is disclosed in the following patent specifications: (1) U.S. Patent Publication No. 2009/0292472 of U.S. patent application Ser. No. 11/721,879 entitled "Method for the Characterization of Geological Formations," filed on Jun. 15, 2007, owned by "Schlumberger", such as "Services Petroliers Schlumberger" or "Schlumberger Technology Corporation", the disclosure of which is incorporated by reference into the specification of this application, and (2) U.S. patent application Ser. No. 11/382,514 issued as U.S. Pat. No. 7,532,983 and entitled "Method and Apparatus for Measuring the Wettability of Geological Formations," filed on May 10, 2006, owned by "Schlumberger", such as "Services Petroliers Schlumberger" or "Schlumberger Technology Corporation", the disclosure of which is incorporated by reference into the specification of this application.

Another interesting possibility for a wettability logging tool is a tool based on Nuclear Magnetic Resonance (NMR) downhole measurements. A method for determining 'wettability' of an oil reservoir using NMR measurements is disclosed in U.S. Pat. No. 6,765,380 to Freedman et al, the disclosure of which is incorporated by reference into the specification of this application. The T2 relaxation time of protons and the diffusion coefficient D measured with NMR tools are sensitive to the interaction of protons with the surface of grains in the porous medium. The wetting by formation fluids of the grains surface is producing effects which give experts a qualitative indication of wettability. It is possible that one might be able to derive a quantitative measurement of wettability, and perhaps the structural oil-wetting index 'Xo', from a suitable combination of NMR measurements.

However, hereinafter, the term 'wettability logging tool' will refer to any such logging tool that measures the structural oil-wetting index (Xo), including tools that are based on 'resistivity' and 'saturation' measurements and 'NMR' measurements and any other suitable measurements or combination of measurements.

Referring to FIG. 8, a schematic description of a '3D wettability map' of an oil and gas reservoir is illustrated. In FIG. 8, a set of wellbores drilled in the reservoir are illustrated along with a corresponding set of 'wettability logs' that are generated by using a wettability logging tool disposed in those wellbores.

In FIG. 8, the interpolation or extrapolation of 'wettability values' around the wellbores of FIG. 8, and between such wellbores, is accomplished by using certain algorithms which combine: (1) the geological model of the reservoir, (2) the rock types identified from logging measurements and correlated with geological layers (i.e., lithology), (3) the fluids contact surfaces in the reservoir (i.e., Gas/Oil, Oil/Water), and (4) other structural information, such as reservoir compartments (i.e., Faults, flow barriers) and other appropriate information. Geostatiscal algorithms can also be used to introduce a controlled dose of randomness in the extrapolated and interpolated wettability data (Geochemistry must be taken into account when creating a 3D wettability distribution).

In FIG. 8, such a '3D wettability map' of the reservoir constitutes, in itself, a key decision tool for the optimum placement of injection and production wells.

Figure 9:
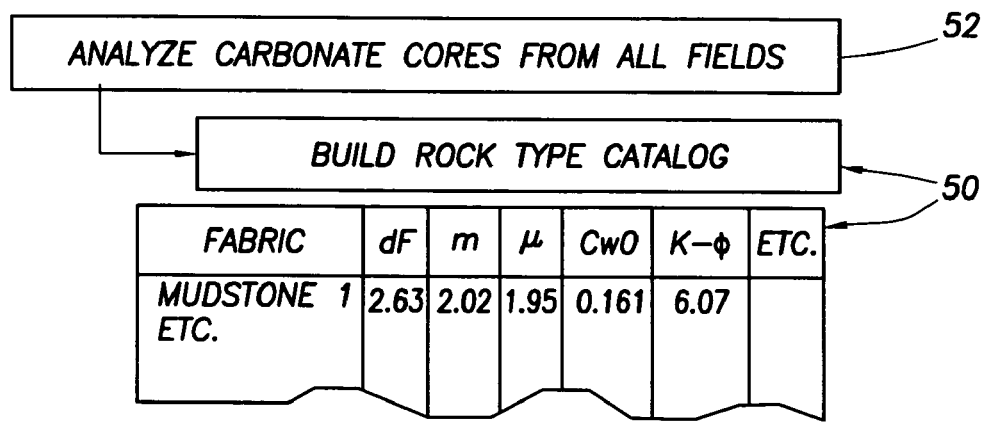
Figure 10:
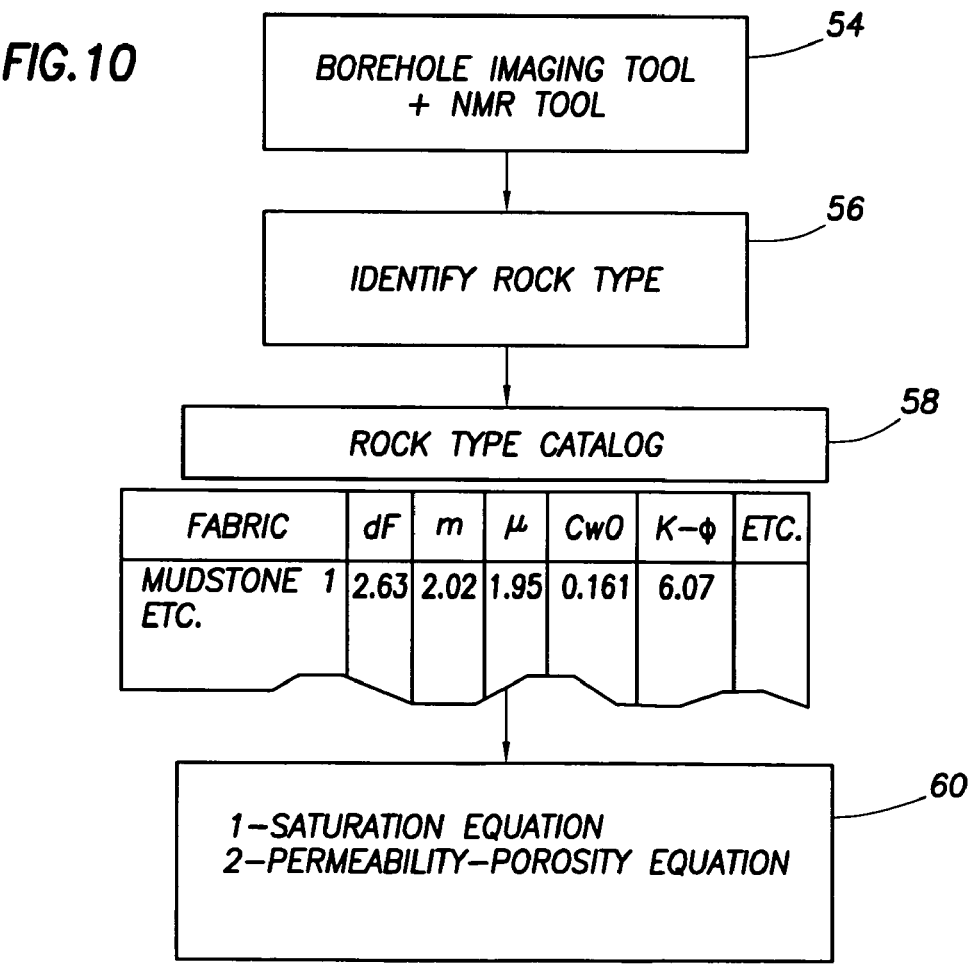

Referring to FIGS. 9 and 10, a method is illustrated that is adapted for deriving a more accurate 'permeability' model and a more accurate 'saturation' model. The method illustrated in FIGS. 9 and 10 is used for defining a set of parameter values of 'permeability' and 'saturation'. These parameter values of 'permeability' and 'saturation' will be used (for these parameters) in the reservoir model (i.e., the simulation results 20 of FIG. 2) and the simulation grid (i.e., the simulation model 14 of FIG. 2).

In FIG. 9, a step is illustrated which comprises the building a global catalog of rock types 50 from core samples 52 collected in oil and gas fields around the world, or in a given region for a local rock type catalog. A 'series of measurements' are made on cores disposed in a laboratory that are all characteristic of pore space geometry. For example, the 'series of measurements' include a measurement of the cementation exponent (also called 'm' exponent) of Archie's law linking the 'porosity': to the resistivity of a core completely saturated with brine, or to the exponent 'a' and the prefactor 'Ko' of the permeability. Porosity law applicable to the core sample usually takes the form:

$$K=K_0\phi^a,$$

or any other parameters allowing for the modeling of the transport properties (i.e., electrical conductivity equation, fluid flow equation) of each rock type.

In FIG. 10, a process is illustrated that is adapted for characterizing the 'saturation model' and the 'permeability model' for a reservoir. In FIG. 10, appropriate 'logging tools' 54 are run into wellbores for the purpose of determining the 'rock types' 56 present in the reservoir. These 'logging tools' can consist of a combination of: (1) lithology logging tools (such as an NMR logging tool 54), and (2) borehole imaging tools 54. For each 'rock type' identified from these logging measurements, the reservoir modeling software looks for certain 'key parameters' in the memorized 'rock type' catalog 58, and then the reservoir modeling software uses these 'key parameters' to select corresponding 'saturation' and 'permeability' equations 60 for the reservoir model and simulation grid.

Referring to FIG. 11, an example of a process is illustrated that can be utilized for modeling the 'dynamic parameters', such as 'permeabilities relative to oil and water', and 'capillary pressure as functions of water saturation and wettability in downhole conditions'. In FIG. 11, hydro-dynamical tools are used, such as the MDT or equivalent tools, that are designed to create 'formation fluid flows' between the tool and the formation (in and out of the formation) and to measure relevant parameters, such as pressure, temperature, flow rates, water/oil/gas respective fractions in fluids and combined with other parameters as required, such as porosity and wettability. From these measurements, effective permeabilities relative to oil and water respectively, and capillary pressure are acquired versus water saturation and wettability and the characteristic parameters of the models are extracted and used for the reservoir model and simulation grid. Relative permeabilities to water and oil may be measured directly or derived by combining effective permeabilities with permeability derived from the rock type 56, as shown in FIG. 10.

In FIG. 11, although traditional reservoir simulation models have traditionally obtained 'relative permeability' and 'capillary pressure' information from laboratory measurements, in this specification, the 'relative permeability model (kr)' and the 'capillary pressure model (Pc)' information 66 are each obtained from 'wettability measurements' obtained from 'wettability logs (Xo)' 64 that are also accompanied by 'other dynamic measurements' 62, such as the Modular Dynamic Tester (MDT), or equivalent, downhole dynamic measurements that are illustrated in step 62 of FIG. 11. Consequently, in this specification, in FIG. 11, by obtaining 'wettability measurements' 64 from 'wettability logs' 64 of FIG. 11 generated from 'wettability logging tools', and by combining these 'wettability measurements' 64 of FIG. 11 with the 'other dynamic measurements' 62, such as the 'MDT (or equivalent) downhole measurements' of step 62 of FIG. 11, one can generate and determine the 'relative permeability model (kr)' and the 'capillary pressure model (Pc)' 66 distribution throughout the reservoir. In FIG. 11, the 'effective permeability model (Keff)' and 'capillary pressure model (Pc)' 68 is determined from the 'relative permeability model (kr)' and 'capillary pressure model (Pc)' 66. As a result, the 'effective permeability model (Keff)' and the 'capillary pressure model (Pc)' 68 are used in the Reservoir Simulator 12', as indicated by step 70 in FIG. 11.

Figure 12:
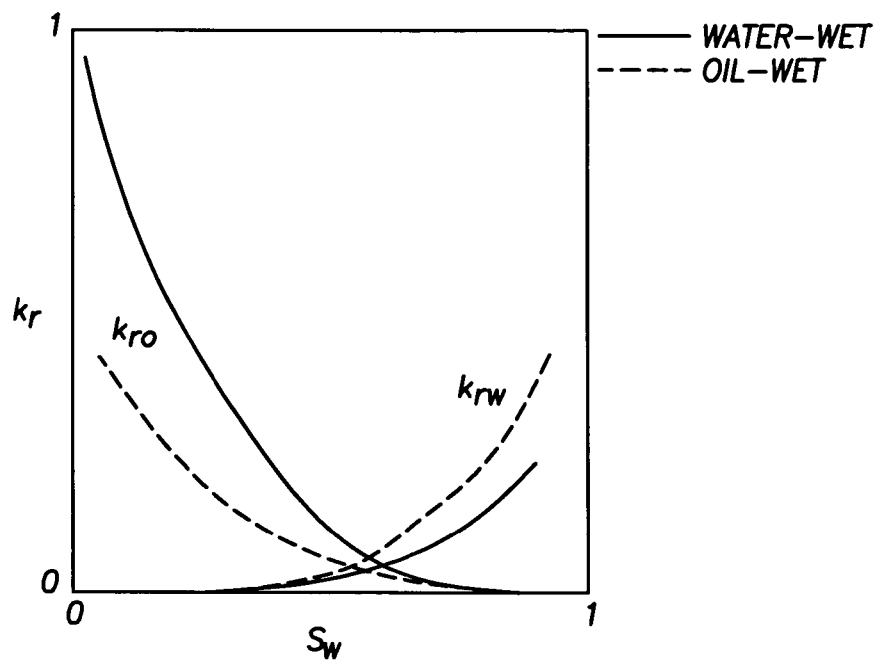
FIG. 12 shows the effect of varying wettability on the relative permeabilities to oil and water.

Referring to FIG. 12, this FIG. 12 illustrates the effect of varying 'wettability' on the relative 'permeabilities' to oil and water. Similar effects must be accounted for in the capillary pressure model.

Figure 13:
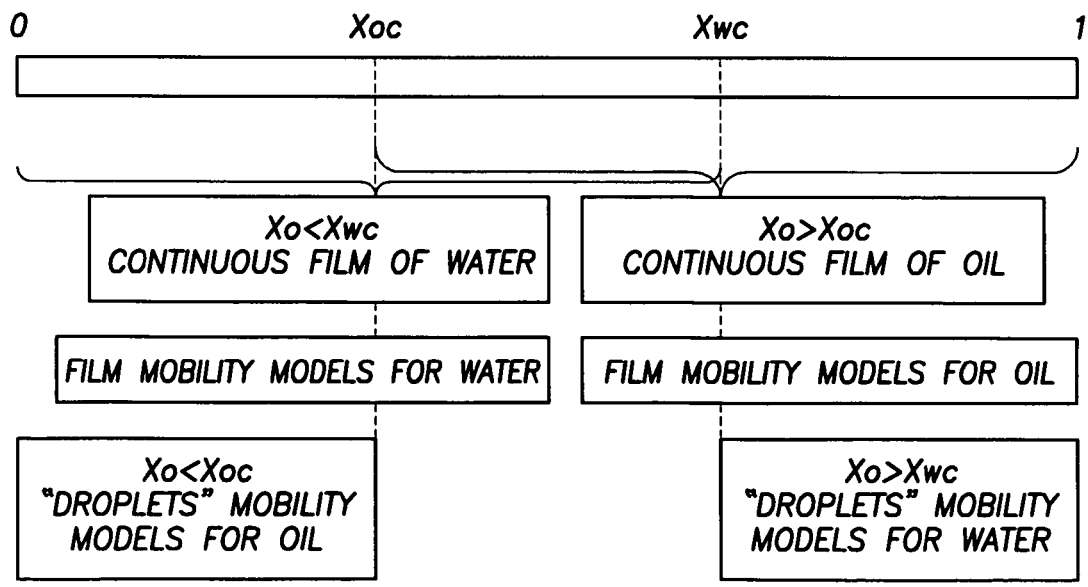
FIG. 13 illustrates the various regimes to be considered in the flow models and the corresponding equations for relative permeabilities and capillary pressures, based on the value of the wettability defined as the structural oil-wetting index 'Xo'.

Referring to FIG. 13, this FIG. 13 illustrates the various regimes to be considered in the flow models and the corresponding equations for relative permeabilities and capillary presssures, based on the value of the 'wettability', which is also known as the 'structural oil-wetting index (Xo)'. For 'Xo' below a certain critical value 'Xwc', the pores surface is sufficiently water-wet for the film of water to be continuous: The formation can imbibe water spontaneously. For 'Xo' above a certain critical value 'Xoc', the symmetrical situation occurs with a continuous film of oil and the formation can imbibe oil. 'Xwc' and 'Xoc' are percolation thresholds, respectively, to water and oil which govern the capillary continuity of these two phases. One probably has Xoc<Xwc for most formations which allows for both water and oil films to co-exist in the porous medium provided Xoc<Xo<Xwc. There are two kinds of oil (and water) mobilities to be considered: Mobility linked to flow in liquid films (which requires the film to exist i.e. for oil flow Xo>Xoc), and mobility linked to droplets flowing in the middle of pores and pore throats which are wetted by the other phase. These two mobilities lead to two relative permeability models. In FIG. 13, there are 3 zones: (1) The zone Xo<Xoc where the film mobility model will be applied to water the overall thickness of the film depending on the water saturation, and a droplet mobility model will be applied to oil; (2) the zone Xoc<Xo<Xwc in which the film mobility model will be applied to both oil and water; and (3) the zone Xo>Xwc where the film mobility model will be applied to oil and a droplet mobility model for water.

In connection with mapping flow barriers caused by strongly oil-wet zones, strongly oil-wet zones can constitute flow barriers in the reservoir. This is well known for tar mats, or layers of very viscous oil. Such zones generally show up on the wettability log as wettability "spikes" with very high value of the critical saturation 'Sc' contrasting with neighbor beds 'Sc' values. One of the interests of the method described here is that such patterns can be detected in mature reservoirs through cased wells. One only needs to run special cased hole tools such as CHFR (Cased Hole Formation Resistivity tool) and CHDT (Cased Hole Density Tool) or TDT in order to measure formation resistivity, formation water saturation measured with nuclear tools from neutron capture cross-section (sigma) measurement, and formation density measured with same nuclear tools. The 'wettability logs' (Cw or Sc) can then be computed from these measurements using the model described herein and assuming a value for the exponent μ. Well-to-well correlations of the wettability logs obtained from various wells in the reservoir can then be made to determine the lateral extent of these strongly oil-wet beds.

As a result, in this specification, a reservoir modeling and simulation software, including its corresponding method and system and program storage device, is disclosed which will use a 3D wettability map of the reservoir to adjust flow models in each grid block, such as the permeability model and the capillary pressure model in each grid block, as a function of the local wettability value. The reservoir modeling and simulation software will also conduct a new process for estimating a new relative permeability and capillary pressure system starting from a true reservoir wettability distribution, where the new process for numerical reservoir models will handle wettability change efficiently and more accurately. The reservoir modeling and simulation software will use the structural oil-wetting index (Xo) as a measure of wettability which is defined as 'the fraction of total pores surface in the matrix which is covered by hydrocarbons'. The reservoir modeling and simulation software will also use a 3D wettability map obtained by extrapolation/interpolation of multiple wettability logs that are acquired in wells using logging tools. The reservoir modeling and simulation software will also use critical water fractions (Cw, Cw') or, equivalently, critical saturation (Sc, Sc') logs to assess the distribution of the wettability along a well. The reservoir modeling and simulation software will further use a Nuclear Magnetic Resonance (NMR) tool or a pressure tool [i.e., the Modular Dynamics Tester (MDT)] to determine the ratio of the porosity of the oil-wet zones of the rock matrix to the total porosity of the rock ($\phi_o/\phi$) so as to calculate the structural oil-wetting index (Xo) of the formation direction from Cw, Cw' or Sc, Sc' logs. In addition, the reservoir modeling and simulation software will use dynamic models derived from measurements made downhole using hydro-dynamical tools (62 of FIG. 11) combined with a wettability logging tool (64 of FIG. 11). Furthermore, the reservoir modeling and simulation software will estimate the 'capillary pressure' from the ratio of the porosity of the oil-wet zones of the rock matrix to the total porosity of the rock ($\phi_o/\phi$) determined using a NMR tool. In addition, the reservoir modeling and simulation software will use the dynamic models for relative permeabilities and 'capillary pressure' that are characterized by three sets of equations depending of the value of the wettability defined as the structural oil-wetting index Xo, a first set of equations where 'Xo' less than a critical value 'Xoc', a second set of equations where 'Xo' greater than or equal to 'Xoc' and less than a critical value 'Xwc', and a third set of equations where 'Xo' is greater than or equal to 'Xwc'. The reservoir modeling and simulation software also detects flow barriers created by strongly oil-wet layers in the reservoir, such as tar mats, including the step of: the selection of a threshold for the logged parameter (being Cw, or Sc, or Xo) above which such a blocking layer is defined. The method, practiced by the reservoir modeling and simulation software to detect flow barriers through casing, can also be characterized by the use of a combination of cased hole tools to measure formation resistivity behind casing (CHFR), formation density behind casing, and formation water saturation behind casing (CHDT or TDT). The method can also determine the lateral extent of strongly oil-wet layers in the reservoir characterized by the use of a well-to-well wettability log correlation process to map the continuity of the strongly oil-wet layers in horizontal planes or along surfaces following the geological model (beddings).

A functional description of the operation of the aforementioned 'Reservoir Modeling System' of FIG. 2, that is adapted for practicing a '3D numerical flow simulation, will be set forth in the following paragraphs with reference to FIGS. 1 through 13 of the drawings.

Referring initially to FIG. 2, the well logs 24, the seismic data 26, and the other input data 28 are generated and provided to the Flogrid software 22. The well logs 24 include a set of 'wettability logs (Xo)' which are generated by a 'Wettability Logging Tool' disposed in a wellbore. An example of a 'Wettability Logging Tool' is disclosed in the following patent specifications: (1) U.S. Patent Publication No. 2009/0292472 of U.S. patent application Ser. No. 11/721,879 entitled "Method for the Characterization of Geological Formations," filed on Jun. 15, 2007, owned by "Schlumberger", such as "Services Petroliers Schlumberger" or "Schiumberger Technology Corporation", the disclosure of which is incorporated by reference into the specification of this application, and (2) U.S. patent application Ser. No. 11/382,514 issued as U.S. Pat. No. 7,532,983 and entitled "Method and Apparatus for Measuring the Wettability of Geological Formations," filed on May 10, 2006, owned by "Schlumberger", such as "Services Petroliers Schiumberger" or "Schlumberger Technology Corporation", the disclosure of which is incorporated by reference into the specificiation of this application. A method for determining 'wettability' of an oil reservoir using NMR measurements is disclosed in U.S. Pat. No. 6,765,380 to Freedman et al, the disclosure of which is incorporated by reference into the specification of this application. As noted earlier, the well logs 24 include a set of 'wettability logs (Xo)' which are generated by a 'Wettability Logging Tool' disposed in a wellbore. The 'wettability logs (Xo)' 24, including the seismic data 26 and the other input data 28 are used to generate the Reservoir Framework 22a which includes the Mapping Package 32 and the Geo-Modeller 34. The Reservoir Framework 22a actually represents the '3D Wettability Map' illustrated in FIG. 8 and discussed below with reference to FIG. 8. The '3D Wettability Map' of FIG. 8 represents a section of Earth formation which contains and includes a multitude of 'local values of wettability' in the earth formation, where each local value of wettability is associated with a single location on the 3D map of FIG. 8. Therefore, the multitude of local values of wettability on the '3D Wettability Map' of FIG. 8 is associated, respectively, with a corresponding multitude of locations on a section of Earth formation on the Structural Model 22b. As a result, the '3D Wettability Map' of FIG. 8, represented by the Reservoir Framework 22a, is used to build the Structural Model 22b. The Structural Model 22b (containing a multitude of 'local values of wettability') is gridded by the Flogrid Gridder 22c (in the manner discussed in U.S. Pat. No. 6,106,561 to Farmer, the disclosure of which has already been incorporated by reference into the specification of this application) thereby generating a gridded Simulation Model 14. That is, when the Structural Model 22a (representing a section of Earth Formation containing a multitude of 'local values of wettability') is gridded by structured or unstructured grids in the manner discussed in U.S. Pat. No. 6,106,561 to Farmer, a multitude of structured and/or unstructured grid cells (14a of FIG. 2) will overlay the Earth Formation of the Structural Model 22b, thereby generating a gridded Simulation Model 14, where the gridded Simulation Model 14 includes a multitude of grid cells 14a, and where each grid cell 14a of the gridded Simulation Model 14 includes its own corresponding 'local value of wettability', where the 'local value of wettability' associated with each grid cell 14a of FIG. 2 is obtained from the '3D Wettability Map', an example of which is shown in FIG. 8. The 'local value of wettability' associated with 'each grid cell' 14a is used to calculate and determine a 'relative permeability model' and a 'capillary pressure model' for 'each grid cell 14a, the 'relative permeability model' being used to determine an 'effective permeability model' for said 'each grid cell' 14a. Therefore, an 'effective permeability model' and a 'capillary pressure model' exists for 'each grid cell' 14a of the gridded Simulation Model 14. Since the 'effective permeability model' and the 'capillary pressure model' for 'each grid cell' 14a of the gridded Simulation Model 14 is based on the '3D Wettability Map' of FIG. 8, which, in turn, is generated in response to the 'wettability logs (Xo) generated by the 'wettability logging tools' disposed downhole, the 'effective permeability model' and the 'capillary pressure model' for said 'each grid cell' 14a of the gridded Simulation Model 14 is deemed to be more accurate. In FIG. 11, note steps 62, 64, 66, 68, and 70. In FIG. 11, a 'relative permeability model' and a 'capillary pressure model' 66 is generated in response to: (1) the 'wettability logs (Xo)' 64 of a wettability logging tool disposed downhole, and (2) 'other downhole measurements' 62 generated by other tools disposed downhole (such as the 'Modular Dynamics Tester (MDT)' tool owned and operated by Schlumberger Technology Corporation). In FIG. 11, an 'effective permeability model' 68 is generated in response to the 'relative permeability model' 66 thereby generating an 'effective permeability model' 68 and a 'capillary pressure model' 68 for each grid cell 14a of the gridded Simulation Model 14 of FIG. 2. In FIG. 11, the 'effective permeability model (Xo)' 68 and the 'capillary pressure model (Xo)' 68 are each provided to, and are used by, the reservoir simulator 12 of FIG. 2 (as indicated by step 70 of FIG. 11). In FIG. 11, note also that the 'other dynamic measurements' 62 [such as the Modular Dynamic Tester (MDT), or equivalent, downhole measurements of step 62 in FIG. 11] also accompany the 'wettability measurements' 64 that are obtained from the 'wettability log (Xo)' 64 in FIG. 11. Therefore, in FIG. 2, each 'grid cell' 14a of the gridded Simulation Model 14 includes: (1) its own corresponding 'local value of wettability' determined from the '3D Wettability Map' (as shown in FIG. 8) which is determined from the 'wettability logs (Xo)' 64, (2) its own 'relative permeability model (Kr)' 66 of FIG. 11 and its own 'effective permeability model' 68 of FIG. 11 which is determined from its own 'local value of wettability' obtained from the '3D Wettability Map' of FIG. 8, and (3) its own 'capillary pressure model (Pc)' 68 of FIG. 11 which is determined from its own 'local value of wettability' that is obtained from the '3D Wettability Map' of FIG. 8. Recall that each 'effective permeability model' 68 and each 'capillary pressure model' 68 in each grid cell 14a of the gridded Simulation Model 14 are derived from the 'local value of wettability' in each grid cell 14a, the 'local value of wettability' in each grid cell 14a being derived from actual measurements made with specific 'wettability logging tools' run in wellbores; and recall that these 'effective permeability' and 'capillary pressure' models 68 do not rely on core measurements made in the laboratory, since the core measurements made in the laboratory are not deemed to be fully representative of downhole conditions. In FIG. 2, the simulator 12 is executed by Processor 10a of FIG. 1 while responding to the gridded Simulation Model 14 (of FIGS. 1 and 2) and the Engineering Data 16, thereby generating the set of Simulation Results 20 which are displayed on the 3D Viewer 10d. Since each of the grid cells 14a of the gridded Simulation Model 14 includes (1) its own corresponding 'local value of wettability' determined from the '3D Wettability Map' (as shown in FIG. 8) which is determined from the 'wettability logs (Xo)', (2) its own 'relative permeability model (Kr)' and its own 'effective permeability model' which is determined from its own 'local value of wettability', and (3) its own 'capillary pressure model (Pc)' which is determined from its own 'local value of wettability', when the Simulator 12 of FIGS. 1 and 2 is executed by Processor 10a, the Simulation Results 20 displayed on the 3D Viewer 10d of FIG. 2 are now deemed to be more accurate than ever before.

In FIG. 2, the 'relative permeability model' (Kr) and the 'effective permeability model' (Keff) and the 'capillary pressure model' (Pc), in each grid cell 14a of the gridded Simulation Model 14 of FIG. 2, are each estimated from 'actual wettability measurements' (in addition to the 'other dynamic measurements' 62, such as the MDT of step 62 of FIG. 11) that are generated from the 'wettability logs (Xo)' [24 of FIG. 2] associated with the 'wettability logging tools' disposed downhole. That is, the aforementioned 'effective permeability models' and the aforementioned 'capillary pressure models' are not being estimated from the aforementioned 'Laboratory Measurements'. As a result, the user/operator of the workstation 10 of FIG. 1 will now analyze the Simulation Results 20 (which are now deemed to be more accurate than ever before) to determine characteristics of the reservoir depicted by the Simulation Model 14. This allows the user/operator to completely account for the distribution of wettability in the reservoir when doing multi-phase flow simulations with a dramatic impact on fluid front propagation and hydrocarbon production predictions.

The above description of the 'method for modeling a reservoir' being thus described, it will be obvious that the same may be varied in many ways. Such variations are not to be regarded as a departure from the spirit and scope of the claimed method or system or program storage device or computer program, and all such modifications as would be obvious to one skilled in the art are intended to be included within the scope of the following claims.

We claim:

1. A method of modeling a reservoir, comprising:
   receiving a 3D wettability map of the reservoir that is generated from wettability logs of a wettability logging tool disposed in a wellbore;
   defining, by a computer processor using the wettability map, a local value of wettability for each grid block of a gridded simulation model, wherein the local value of wettability is the percentage of total pores surface in contact with hydrocarbons of the reservoir; and
   defining, by the computer processor using the local value of wettability, a permeability model and a capillary pressure model for each grid block of the gridded simulation model that is provided to a simulator executing on the computer processor when modeling the reservoir.

2. A computer readable medium comprising instructions adapted to be executed by a processor, said instructions, when executed causing said processor to
   receive a 3D wettability map of a reservoir that is generated from wettability logs of a wettability logging tool disposed in a wellbore;
   define, from the wettability map, a local value of wettability for each grid block of a gridded simulation model, wherein the local value of wettability is the percentage of total pores surface in contact with hydrocarbons of the reservoir; and
   define, from the local value of wettability, a permeability model and a capillary pressure model for each grid block of the gridded simulation model that is provided to a simulator executing on the processor when modeling the reservoir.

3. A method of modeling a reservoir, comprising:
   (a) generating a set of wettability logs from a wettability logging tool disposed in a wellbore;
   (b) generating a 3D wettability map of the reservoir from the set of wettability logs generated by the wettability logging tool disposed in the wellbore;
   (c) determining, by a computer processor using the wettability map, a local value of wettability for each grid cell of a gridded simulation model, wherein the local value of wettability is the percentage of total pores surface in contact with hydrocarbons of the reservoir; and (d) determining, by the computer processor using the local value of wettability associated with each grid cell, a permeability model and a capillary pressure model for each grid cell of the gridded simulation model, the permeability model and the capillary pressure model being provided to a simulator executing on the computer processor when the simulator models the reservoir.

4. The method of claim 3, further comprising:
generating other downhole measurements from other tools disposed in said wellbore.

5. The method of claim 4, wherein the determining step (d) adapted for determining, from the local value of wettability associated with each grid cell, a permeability model and a capillary pressure model for each grid cell of the gridded simulation model comprises:
determining a relative permeability model and the capillary pressure model for each grid cell of the gridded simulation model in response to the local value of wettability for each grid cell generated by the set of wettability logs and in response to the other downhole measurements.

6. The method of claim 5, wherein the determining step (d) adapted for determining, from the local value of wettability associated with each grid cell, a permeability model and a capillary pressure model for each grid cell of the gridded simulation model further comprises:
determining an effective permeability model and the capillary pressure model for each grid cell of the gridded simulation model in response to the relative permeability model and the capillary pressure model for each grid cell of the gridded simulation model, the effective permeability model and the capillary pressure model being provided to the simulator when the simulator models the reservoir.

7. A program storage device readable by a machine tangibly embodying a program of instructions executable by the machine to perform method steps for modeling a reservoir, said method steps comprising:
(a) generating a set of wettability logs from a wettability logging tool disposed in a wellbore;
(b) generating a 3D wettability map of the reservoir from the set of wettability logs generated by the wettability logging tool disposed in the wellbore;
(c) determining, from the wettability map, a local value of wettability for each grid cell of a gridded simulation model, wherein the local value of wettability is the percentage of total pores surface in contact with hydrocarbons of the reservoir; and
(d) determining, from the local value of wettability associated with each grid cell, a permeability model and a capillary pressure model for each grid cell of the gridded simulation model, the permeability model and the capillary pressure model being provided to a simulator when the simulator models the reservoir.

8. The program storage device of claim 7, further comprising:
generating other downhole measurements from other tools disposed in said wellbore.

9. The program storage device of claim 8, wherein the determining step (d) adapted for determining, from the local value of wettability associated with each grid cell, a permeability model and a capillary pressure model for each grid cell of the gridded simulation model comprises:
determining a relative permeability model and the capillary pressure model for each grid cell of the gridded simulation model in response to the local value of wettability for each grid cell generated by the set of wettability logs and in response to the other downhole measurements.

10. The program storage device of claim 9, wherein the determining step (d) adapted for determining, from the local value of wettability associated with each grid cell, a permeability model and a capillary pressure model for each grid cell of the gridded simulation model further comprises:
determining an effective permeability model and the capillary pressure model for each grid cell of the gridded simulation model in response to the relative permeability model and the capillary pressure model for each grid cell of the gridded simulation model, the effective permeability model and the capillary pressure model being provided to the simulator when the simulator models the reservoir.

11. A computer readable medium comprising instructions adapted to be executed by a processor, said instructions, when executed causing said processor to
(a) generate a set of wettability logs from a wettability logging tool disposed in a wellbore;
(b) generate a 3D wettability map of a reservoir from the set of wettability logs generated by the wettability logging tool disposed in the wellbore;
(c) determine from the wettability map, a local value of wettability for each grid cell of a gridded simulation model, wherein the local value of wettability is the percentage of total pores surface in contact with hydrocarbons of the reservoir; and
(d) determine, from the local value of wettability associated with each grid cell, a permeability model and a capillary pressure model for each grid cell of the gridded simulation model, the permeability model and the capillary pressure model being provided to a simulator when the simulator models the reservoir.

12. The computer readable medium of claim 11, said instructions further causing said processor to
generate other downhole measurements from other tools disposed in said wellbore.

13. The computer readable medium of claim 12, wherein the determining step (d) adapted for determining, from the local value of wettability associated with each grid cell, a permeability model and a capillary pressure model for each grid cell of the gridded simulation model comprises:
determining a relative permeability model and the capillary pressure model for each grid cell of the gridded simulation model in response to the local value of wettability for each grid cell generated by the set of wettability logs and in response to the other downhole measurements.

14. The computer readable medium of claim 13, wherein the determining step (d) adapted for determining, from the local value of wettability associated with each grid cell, a permeability model and a capillary pressure model for each grid cell of the gridded simulation model further comprises:
determining an effective permeability model and the capillary pressure model for each grid cell of the gridded simulation model in response to the relative permeability model and the capillary pressure model for each grid cell of the gridded simulation model, the effective permeability model and the capillary pressure model being provided to the simulator when the simulator models the reservoir.

15. A system adapted for modeling a reservoir, comprising:
a processor;
a memory comprising software instructions, the software instructions when executed causing the processor to:

generate a set of wettability logs from a wettability logging tool disposed in a wellbore;
generate a 3D wettability map of the reservoir from the set of wettability logs generated by the wettability logging tool disposed in the wellbore;
determine, from the wettability map, a local value of wettability for each grid cell of a gridded simulation model, wherein the local value of wettability is the percentage of total pores surface in contact with hydrocarbons of the reservoir; and
determine, from the local value of wettability associated with each grid cell, a permeability model and a capillary pressure model for each grid cell of the gridded simulation model, the permeability model and the capillary pressure model being provided to a simulator when the simulator models the reservoir.

16. The system of claim 15, the software instructions further causing the processor to generate other downhole measurements from other tools disposed in said wellbore.

17. The system of claim 16, wherein determining, from the local value of wettability associated with each grid cell, a permeability model and a capillary pressure model for each grid cell of the gridded simulation model comprises:
determining a relative permeability model and the capillary pressure model for each grid cell of the gridded simulation model in response to the local value of wettability for each grid cell generated by the set of wettability logs and in response to the other downhole measurements.

18. The system of claim 17, wherein determining, from the local value of wettability associated with each grid cell, a permeability model and a capillary pressure model for each grid cell of the gridded simulation model further comprises:
determining an effective permeability model and the capillary pressure model for each grid cell of the gridded simulation model in response to the relative permeability model and the capillary pressure model for each grid cell of the gridded simulation model, the effective permeability model and the capillary pressure model being provided to the simulator when the simulator models the reservoir.

19. A method for modeling a reservoir, comprising:
receiving a set of wettability logs from a wettability logging tool adapted to be disposed in a wellbore;
generating a wettability map in response to said wettability logs;
generating, by a computer processor, a gridded simulation model, said gridded simulation model including a plurality of grid cells;
determining, by said computer processor a local value of wettability from said wettability map for each grid cell of said gridded simulation model, wherein the local value of wettability is the percentage of total pores surface in contact with hydrocarbons of the reservoir;
determining, for each grid cell of said gridded simulation model, a permeability model and a capillary pressure model from said local value of wettability associated with said each grid cell; and
generating, by said computer processor, a set of simulation results representing characteristics of said reservoir.

20. A program storage device readable by a machine tangibly embodying a program of instructions executable by the machine to perform method steps for modeling a reservoir, said method steps comprising:
receiving a set of wettability logs from a wettability logging tool adapted to be disposed in a wellbore;
generating a wettability map in response to said wettability logs;
generating a gridded simulation model, said gridded simulation model including a plurality of grid cells;
determining, for each grid cell of said gridded simulation model, a local value of wettability from said wettability map, wherein the local value of wettability is the percentage of total pores surface in contact with hydrocarbons of the reservoir;
determining, for each grid cell of said gridded simulation model, a permeability model and a capillary pressure model from said local value of wettability associated with said each grid cell; and
generating a set of simulation results representing characteristics of said reservoir.

21. A computer readable medium comprising instructions adapted to be executed by a processor, said instructions, when executed causing said processor to
receiving a set of wettability logs from a wettability logging tool adapted to be disposed in a wellbore;
generating a wettability map in response to said wettability logs;
generating a gridded simulation model, said gridded simulation model including a plurality of grid cells;
determining, for each grid cell of said gridded simulation model, a local value of wettability from said wettability map, wherein the local value of wettability is the percentage of total pores surface in contact with hydrocarbons of a reservoir;
determining, for each grid cell of said gridded simulation model, a permeability model and a capillary pressure model from said local value of wettability associated with said each grid cell; and
generating a set of simulation results representing a-model characteristics of said reservoir.

22. A system adapted for modeling a reservoir, comprising:
a processor;
a memory comprising software instructions, the software instructions when executed causing the processor to:
responsive to a set of wettability logs from a wettability logging tool adapted to be disposed in a wellbore, generate a wettability map;
generate a gridded simulation model, said gridded simulation model including a plurality of grid cells;
determine, for each grid cell of said gridded simulation model, a local value of wettability from said wettability map, wherein the local value of wettability is the percentage of total pores surface in contact with hydrocarbons of the reservoir;
determine, for each grid cell of said gridded simulation model, a permeability model and a capillary pressure model from said local value of wettability associated with said each grid cell; and
generate a set of simulation results representing characteristics of said reservoir.

* * * * *